(12) United States Patent
Konno et al.

(10) Patent No.: US 12,366,470 B2
(45) Date of Patent: Jul. 22, 2025

(54) CALIBRATION APPARATUS, CALIBRATION METHOD, AND NON-TRANSITORY COMPUTER READABLE MEDIUM HAVING RECORDED THEREON CALIBRATION PROGRAM

(71) Applicant: Asahi Kasei Microdevices Corporation, Tokyo (JP)

(72) Inventors: Shota Konno, Tokyo (JP); Takato Katayama, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 454 days.

(21) Appl. No.: 17/844,761

(22) Filed: Jun. 21, 2022

(65) Prior Publication Data

US 2022/0412782 A1 Dec. 29, 2022

(30) Foreign Application Priority Data

Jun. 28, 2021 (JP) ................................. 2021-107088
Apr. 19, 2022 (JP) ................................. 2022-068806

(51) Int. Cl.
*G01D 18/00* (2006.01)
*G01D 5/56* (2006.01)
*G01D 5/58* (2006.01)

(52) U.S. Cl.
CPC ............. *G01D 18/001* (2021.05); *G01D 5/56* (2013.01); *G01D 5/58* (2013.01)

(58) Field of Classification Search
CPC .......... G01D 18/001; G01D 5/56; G01D 5/58; G01D 5/244
See application file for complete search history.

(56) References Cited

U.S. PATENT DOCUMENTS

| | | | |
|---|---|---|---|
| 2005/0133705 A1 | 6/2005 | Hare | |
| 2013/0249465 A1* | 9/2013 | Kirihara | H02P 25/06 318/632 |
| 2014/0292311 A1 | 10/2014 | Yonezawa | |
| 2019/0316939 A1* | 10/2019 | Yamamoto | G01D 5/24495 |
| 2020/0003585 A1* | 1/2020 | Narita | G01D 5/24476 |
| 2020/0003586 A1* | 1/2020 | Narita | G01D 5/2455 |
| 2020/0173774 A1* | 6/2020 | Kudo | G01D 5/36 |

FOREIGN PATENT DOCUMENTS

| | | | |
|---|---|---|---|
| JP | 2003083768 A | | 3/2003 |
| JP | 2016161433 A | * | 9/2016 |
| JP | 2019184608 A | | 10/2019 |

* cited by examiner

*Primary Examiner* — Jennifer Bahls

(57) ABSTRACT

Provided is a calibration apparatus including: an acquisition unit for acquiring a detection position of a mobile body for each actual position of the mobile body; a calculation unit for calculating, for a detection position of each actual position of the mobile body, an error between a slit position signal for detecting a slit position and an ideal slit number corresponding to the actual position; a determination unit for determining whether two or more actual positions having at least partially different slit numbers in units of first slits of a predefined number correspond to a same detection position; and a generation unit for generating, in response to the two or more actual positions corresponding to a same detection position, a correction value for correcting an error by a magnitude between errors at the two or more actual positions with respect to the slit position signal at the detection position.

20 Claims, 17 Drawing Sheets

CALIBRATION APPARATUS, CALIBRATION METHOD, AND NON-TRANSITORY COMPUTER READABLE MEDIUM HAVING RECORDED THEREON CALIBRATION PROGRAM

The contents of the following Japanese patent application(s) are incorporated herein by reference:
NO. 2021-107088 filed in JP on Jun. 28, 2021
NO. 2022-068806 filed in JP on Apr. 19, 2022

BACKGROUND

1. Technical Field

The present invention relates to a calibration apparatus, a calibration method, and a non-transitory computer readable medium having recorded thereon a calibration program.

2. Related Art

Patent Document 1 describes "A position detection apparatus comprising: a waveform correction unit that corrects waveforms of a first signal detected from a first track provided on a mobile body and having a scale of a predetermined cycle and a second signal detected from a second track provided on the mobile body and having a scale of a cycle less than the predetermined cycle; and a position calculation unit that calculates a position of the mobile body on a basis of the first signal and second signal which are corrected" (claim 1). Patent Document 1 describes "The interpolation angle correction unit 700 corrects the interpolation angle before correction calculated by the interpolation angle calculation unit 250 and the interpolation angle calculation unit 260 on the basis of the error information of the interpolation angle obtained from the correction table 510. At this time, the interpolation angle correction unit 700 obtains the slit number corresponding to the absolute angle θref sent from the angle calculation unit 310, and corrects the interpolation angle corresponding to the slit number using the difference recorded in the correction table 510. The corrected interpolation angle is sent to the angle calculation unit 620. The angle calculation unit (second position calculation unit) 620 calculates the absolute angle on the basis of the corrected interpolation angle. More specifically, the angle calculation unit 620 calculates the absolute angle on the basis of the corrected interpolation angle and the slit number corresponding to the absolute angle θref sent from the angle calculation unit 310." (paragraph 0041).

CITATION LIST

Patent Document

Patent Document 1: International Publication No. 2018/190019

In the position detection apparatus described in Patent Document 1, the slit number corresponding to the absolute angle θref is obtained, and the interpolation angle corresponding to the slit number is corrected using a difference recorded in the correction table 510. Therefore, when the error of the absolute angle θref is large, the slit number may be wrong, and the wrong difference value may be read from the correction table.

SUMMARY

In a first aspect of the present invention, a calibration apparatus is provided. A calibration apparatus includes: an acquisition unit configured to acquire a detection position of a mobile body for each actual position of the mobile body; a calculation unit configured to calculate, for a detection position of each actual position of the mobile body, an error between a slit position signal for detecting a slit position and an ideal slit number corresponding to the actual position of the mobile body; a determination unit configured to determine whether two or more actual positions having at least partially different slit numbers in units of first slits of a predefined number correspond to a same detection position; and a generation unit configured to generate, in response to the two or more actual positions corresponding to a same detection position, a correction value for correcting an error by a magnitude between errors at the two or more actual positions with respect to the slit position signal at the detection position.

In response to a fact that only one actual position corresponds to a certain detection position, the generation unit may be configured to generate a correction value for correcting an error at the one actual position with respect to the slit position signal at the detection position.

In any of the above calibration apparatuses, the generation unit may be configured to generate a correction value for each section of a detection position acquired by the acquisition unit.

In any of the above calibration apparatuses, the generation unit may be configured to calculate a parameter of a correction function representing a correction value corresponding to a detection position for each section of the detection position acquired by the acquisition unit.

In any of the above calibration apparatuses, the generation unit may be configured to calculate a parameter of the correction function by performing Fourier series expansion of a set of correction values corresponding to a detection position for each section of the detection position acquired by the acquisition unit.

In any one of the above calibration apparatuses, the generation unit may be configured to generate, in response to the two or more actual positions corresponding to a same detection position, a correction value for correcting an error by a magnitude obtained by averaging errors at the two or more actual positions with respect to the slit position signal.

In any of the above calibration apparatuses, the generation unit may be configured to determine a correspondence relationship between an actual position and a detection position with a margin at a boundary of the first slit. In any of the above calibration apparatuses, the generation unit may generate the correction value by using at least one actual position corresponding to a detection position including a correspondence between the detection position and the actual position obtained by performing at least one of addition or subtraction of a predefined margin on the boundary of the first slit with respect to the slit position signal.

Any of the above calibration apparatuses may further include an output unit configured to output a correction value to an encoder that calculates a slit number in units of the first slits by rounding off a value obtained by adding the correction value to the slit position signal.

In any of the above calibration apparatuses, the encoder may be configured to calculate a slit number obtained by rounding off a value obtained by adding a correction value to the slit position signal so that the value becomes an integer.

In any of the above calibration apparatuses, the output unit may be configured to write a correction value in a correction table included in the encoder.

The calibration apparatus may further include an inspection unit configured to inspect whether a mistake occurs in a slit number calculated using a slit position signal corrected by a correction value generated by the generation unit.

In any of the above calibration apparatuses, the mobile body may be a rotating body. The rotating body may include: a first track including the first slit in each first cycle obtained by dividing one round of the rotating body by a predefined first number; and a second track including a second slit in each second cycle obtained by dividing one round of the rotating body by a second number smaller than the first number. An encoder to be calibrated may be configured to calculate a detection position of the mobile body on a basis of a first detection value detected from the first track and a second detection value detected from the second track.

The rotating body may further include a third track including a third slit for each third cycle obtained by dividing one round of the rotating body by a third number different from the first number and the second number. The encoder may be configured to calculate a detection position of the mobile body further on a basis of a third detection value detected from the third track.

In a second aspect of the present invention, a calibration method is provided. A calibration method includes: acquiring, by a calibration apparatus, a detection position of a mobile body for each actual position of the mobile body; calculating, by the calibration apparatus, an error between a slit position signal for detecting a slit position and an ideal slit number corresponding to an actual position of the mobile body for a detection position of each actual position of the mobile body; determining, by the calibration apparatus, whether two or more actual positions having at least partially different slit numbers in units of first slits of a predefined number correspond to a same detection position; and generating, in response to the two or more actual positions corresponding to a same detection position, a correction value for correcting an error by a magnitude between errors at the two or more actual positions with respect to the slit position signal at the detection position.

In a third aspect of the present invention, non-transitory computer readable medium having recorded thereon a calibration program executed by a computer is provided. The calibration program causes a computer to function as: an acquisition unit configured to acquire a detection position of a mobile body for each actual position of the mobile body; a calculation unit configured to calculate, for a detection position of each actual position of the mobile body, an error between a slit position signal for detecting a slit position and an ideal slit number corresponding to the actual position of the mobile body; a determination unit configured to determine whether two or more actual positions having at least partially different slit numbers in units of first slits of a predefined number correspond to a same detection position; and a generation unit configured to generate, in response to a two or more actual positions corresponding to a same detection position, a correction value for correcting an error by a magnitude between errors at the two or more actual positions with respect to the slit position signal at the detection position.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
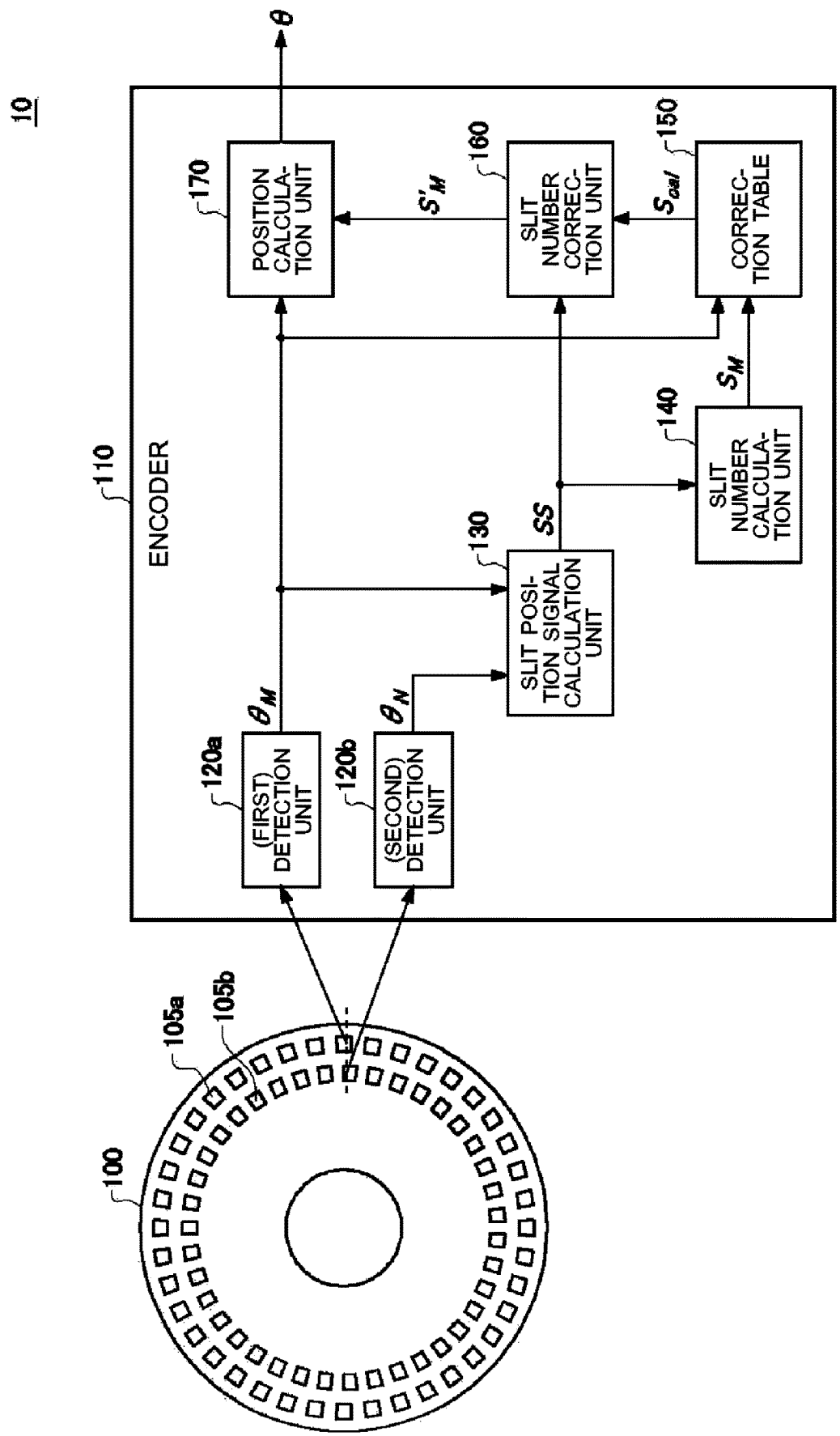
FIG. 1 illustrates a configuration of a position detection apparatus 10 according to the present embodiment.

FIG. 1 illustrates a configuration of a position detection apparatus 10 according to the present embodiment. The position detection apparatus 10 includes a mobile body 100 and an encoder 110. The mobile body 100 is an object to be measured that is a target of position detection by the encoder 110. In the present embodiment, as an example, the mobile body 100 is a disk-shaped rotating body disposed perpendicular to the rotation axis. Alternatively, the mobile body 100 may be a mobile body that moves relative to the encoder 110 along a straight line.

The mobile body 100 includes a plurality of tracks 105a and 105b (also referred to as "track 105"). Each track 105 includes a plurality of slits provided at predefined intervals along the moving direction of the mobile body 100. In the present embodiment, each track 105 includes a plurality of slits provided at equal intervals in the circumferential direction about the rotation axis in the mobile body 100 which is a rotating body. Each slit is a structure body that can be detected by the encoder 110 using magnetism, light, electricity, or the like. For example, each slit is an opening or protrusion provided at equal intervals in the circumferential direction of the mobile body 100, an individual tooth of a gear formed on the outer periphery of the mobile body 100, a magnetized body magnetized at equal intervals in the circumferential direction of the mobile body 100, or the like.

Each of the plurality of tracks 105 may be provided at positions each having different distances (that is, radii) from the rotation axis about the rotation axis on the surface of the mobile body 100. In the present embodiment, the track 105*a* is provided in the circumferential direction in the vicinity of the outer periphery of the mobile body 100, and the track 105*b* is provided in the circumferential direction adjacently to the track 105*a* on the inner peripheral side of the track 105*a*.

Here, the plurality of tracks 105 has slits at different cycles from each other. In the present embodiment, the track 105*a* is an example of a first track, and includes a first slit for each first cycle obtained by dividing one round of the mobile body 100 by a predefined first number $N_M$. The track 105*b* is an example of a second track, and includes a second slit for each second cycle obtained by dividing one round of the mobile body 100 by a second number $N_N$ smaller than the first number. Here, in a case where the number of tracks 105 included in the mobile body 100 is two, the number of slits per round (first number $N_M$) in the track 105*a* and the number of slits per round (second number $N_N$) in the track 105*b* may be coprime. The first number $N_M$ and the second number $N_N$ may be determined such that the difference is 1. For example, the set of the first number $N_M$ and the second number $N_N$ may be (8, 7), (40, 39), (128, 127), or the like.

The encoder 110 calculates a detection position of the mobile body 100 on the basis of a plurality of detection values detected from the plurality of tracks 105 of the mobile body 100. The encoder 110 includes a plurality of detection units 120*a* and 120*b* (also referred to as a "detection unit 120"), a slit position signal calculation unit 130, a slit number calculation unit 140, a correction table 150, a slit number correction unit 160, and a position calculation unit 170.

Each of the plurality of detection units 120 is provided corresponding to each of the plurality of tracks 105, and outputs a detection value detected from the corresponding track 105. In the present embodiment, the detection unit 120*a* functions as a first detection unit, and detects and outputs a first detection value from the track 105*a* which is an example of the first track. The detection unit 120*b* functions as a second detection unit, and detects and outputs a second detection value from the track 105*b* which is an example of the second track. Here, the detection unit 120*a* and the detection unit 120*b* respectively output (electric) interpolation angles $\theta_M$ and $\theta_N$ in which an angle between adjacent slits in the corresponding track 105 is one cycle (=360 degrees).

The slit position signal calculation unit 130 is connected to the plurality of detection units 120. The slit position signal calculation unit 130 outputs a slit position signal SS using the plurality of detection values from the plurality of detection units 120. The slit position signal indicates the slit number of the first slit detected by the detection units 120*a* and 120*b* as a value indicating the position of the mobile body 100 detected by the encoder 110.

The slit number calculation unit 140 is connected to the slit position signal calculation unit 130. Using the slit position signal SS output from the slit position signal calculation unit 130, the slit number calculation unit 140 calculates a slit number $S_M$ (that is, the slit number of the slit in which the mobile body 100 is located) in units of first slits of a predefined number. Here, the detection position of the mobile body 100 before the slit number is corrected by the slit number correction unit 160 is represented by a set of the slit number $S_M$ and the interpolation angle $\theta_M$. In the present embodiment, a mechanical angle $\theta_d$ as an example of the detection position is expressed by the following Expression (1).

$$\theta_d = \frac{360°}{N_M} \times S_M + \frac{\theta_M}{N_M} \qquad (1)$$

The correction table 150 is connected to the detection unit 120*a* and the slit number calculation unit 140. The correction table 150 stores a set of correction values corresponding to the first detection signal (interpolation angle $\theta_M$) detected from the first track for each slit number. The correction table 150 outputs a correction value $S_{cal}$ associated with the interpolation angle $\theta_M$ designated by the first detection signal among the set of correction values associated with the slit number $S_M$ received from the slit number calculation unit 140.

The slit number correction unit 160 is connected to the slit position signal calculation unit 130 and the correction table 150. The slit number correction unit 160 corrects the slit position signal SS received from the slit position signal calculation unit 130 using the correction value $S_{cal}$ received from the correction table 150. Then, the slit number correction unit 160 calculates a slit number $S'_M$ after correction on the basis of the slit position signal after correction. Here, the slit number correction unit 160 calculates the slit number in units of first slits by rounding off the value obtained by adding the correction value to the slit position signal SS from the slit position signal calculation unit 130. When the decimal point of the slit position signal SS is at a position which causes the integer part of the slit position signal SS to correspond to the slit number, the slit number correction unit 160 calculates the slit number obtained by rounding off the value obtained by adding the correction value to the slit position signal SS so that the value becomes an integer.

The position calculation unit 170 is connected to the detection unit 120*a* and the slit number correction unit 160. The position calculation unit 170 calculates the position (position after correction) of the mobile body 100 using the slit number $S'_M$ received from the slit number correction unit 160 and the first detection signal received from the detection unit 120*a*. In the present embodiment, the position calculation unit 170 outputs a mechanical angle A, as a value indicating the position of the mobile body 100, with one rotation of the mobile body 100 as one cycle.

Figure 2:
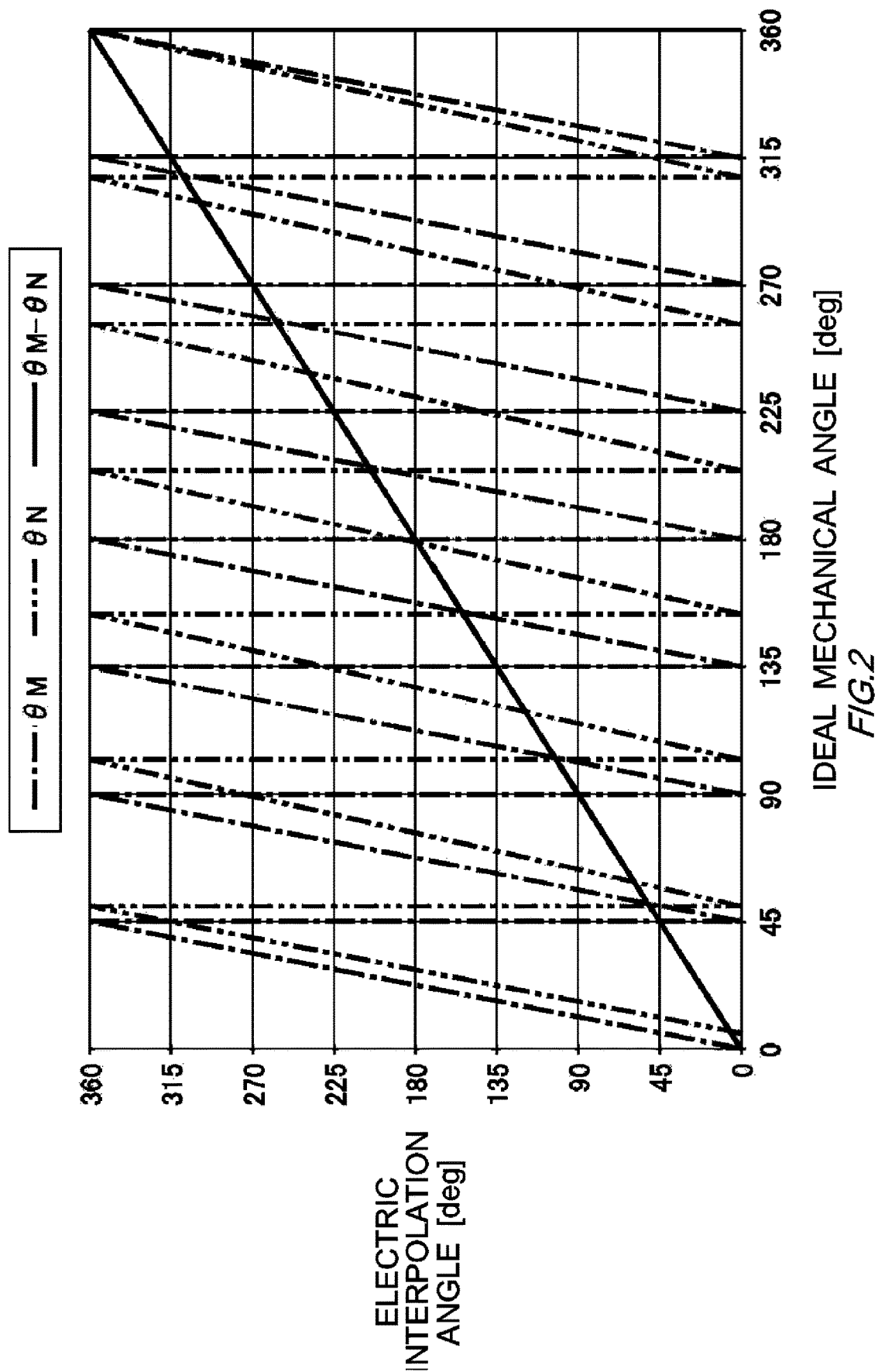
FIG. 2 illustrates an example of a relationship between an ideal mechanical angle and an electric interpolation angle.

FIG. 2 illustrates an example of a relationship between an ideal mechanical angle and an electric interpolation angle. Here, the "ideal mechanical angle" means a mechanical angle in a case where an error is not considered, and corresponds to a real position (actual position) of the mobile body 100. Each of the plurality of detection units 120 outputs an electric interpolation angle having one cycle between adjacent slits in the corresponding track 105. As an example, each detection unit 120 includes two sensors that detect the slit of the track 105, and a phase difference of ¼ cycle (90 degrees) between the slits is provided between the two sensors. As a result, the two sensors can detect a sin voltage and a cos voltage according to the electric interpolation angle from the slits to be sensed.

Each detection unit 120 may correct the waveforms of the sin voltage and the cos voltage output from the two sensors. Specifically, each detection unit 120 may correct at least one of offsets, gains, phases, or distortions of the sin voltage and the cos voltage.

Next, each detection unit 120 calculates an arc tangent (arctan$^{-1}$) using the sin voltage and the cos voltage to calculate an interpolation angle. Each detection unit 120 may correct the interpolation angle using distortion or the like of the amplitudes of the sin voltage and the cos voltage.

In the example of the present drawing, the track 105a has eight slits per round of the mobile body 100, and the track 105b has seven slits per round of the mobile body 100. When the mobile body 100 is rotated one round (from 0 degrees to 360 degrees), the interpolation angle $\theta_M$ output by the detection unit 120a repeats from 0 degrees to 360 degrees for eight cycles, and the interpolation angle $\theta_N$ output by the detection unit 120b repeats from 0 degrees to 360 degrees for seven cycles. Therefore, as illustrated in FIG. 2, the difference $\theta_M$-$\theta_N$ between these interpolation angles changes from 0 degrees to 360 degrees when the mobile body 100 makes one round, and corresponds to the mechanical angle $\theta_d$ illustrated in Expression (1).

The slit position signal calculation unit 130 calculates the slit position signal SS indicating the slit number corresponding to the detection position using the interpolation angles $\theta_M$ and $\theta_N$. Here, the slit position signal SS should ideally match the slit number $S_M$ output by the slit number calculation unit 140. Therefore, when the slit number $S_M$ in Expression (1) is replaced with the slit position signal SS and the mechanical angle θd in Expression (1) is substituted with the difference $\theta_M$-$\theta_N$ between the interpolation angles to be deformed, the slit position signal SS is expressed by the following Expression (2). Note that Expression (2) shows a case where $N_N$=$N_M$−1.

$$SS = \frac{(\theta_M - \theta_N)N_M - \theta_M}{360°} = \frac{\theta_M N_N - \theta_N N_M}{360°} \quad (2)$$

As shown in Expression (2), the slit position signal calculation unit 130 cancels the change in the slit position signal SS due to the change in the interpolation angle $\theta_M$ within one cycle of the slit of the track 105a by multiplying the difference $\theta_M$-$\theta_N$ between the interpolation angles by $N_M$ and subtracting the interpolation angle $\theta_M$. The slit position signal calculation unit 130 divides this by the angle (360 degrees) for one cycle and can calculate the slit position signal SS that ideally takes an integer value from 0 to $N_M$−1 corresponding to the slit number of the track 105a when the mobile body 100 makes one round.

In another embodiment, the slit position signal calculation unit 130 may correct the slit position signal SS using a pre-correction function that calculates a correction value for correcting the slit position signal SS, and then output the slit position signal SS. Such a pre-correction function may be based on, for example, the interpolation angles $\theta_M$ and $\theta_N$ output from the detection unit 120a and the detection unit 120b, and may be based on amplitudes $R_M$ and $R_N$ of the detection values of the detection unit 120a and the detection unit 120b. The pre-correction function may be obtained by adjusting the magnitude and phase of the sine wave (sin) of the difference $\theta_M$-$\theta_N$ between the interpolation angles output from the detection unit 120a and the detection unit 120b according to the target correction amount, for example.

Figure 3:
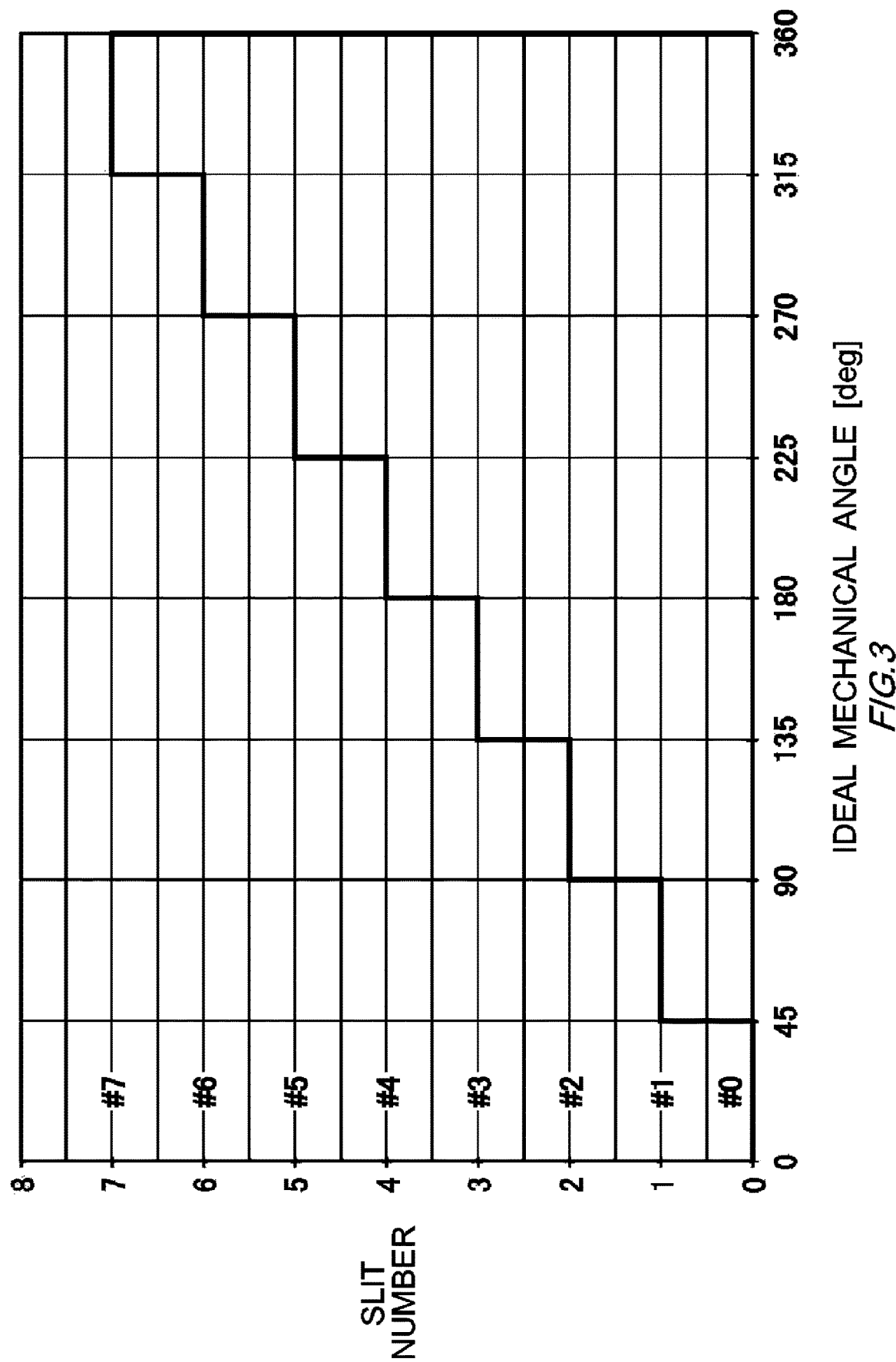
FIG. 3 illustrates an example of a relationship between an ideal mechanical angle and a slit number.

FIG. 3 illustrates an example of a relationship between an ideal mechanical angle and a slit number. The graph of the present drawing illustrates the value of the slit position signal SS according to the mechanical angle when there is no error. In a case where there is no error, the slit position signal SS output by the slit position signal calculation unit 130 indicates the slit number corresponding to the mechanical angle of the mobile body 100, such as 0 in a case where the mobile body 100 is located at the mechanical angle corresponding to the first cycle of the track 105a, 1 in a case where the mobile body 100 is located at the mechanical angle corresponding to the second cycle of the track 105a, and the like.

The slit number calculation unit 140 may calculate the slit number $S_M$ according to the detection position (mechanical angle) of the mobile body 100 by rounding off the slit position signal as shown in the following Expression (3). In this case, the slit position signal SS has a margin in a range of −0.5 or more and less than +0.5 with respect to the error. Therefore, even when the slit position signal has an error in the range of −0.5 or more and less than +0.5, the slit number calculation unit 140 can calculate the correct slit number $S_M$.

$$S_M = \text{round}(SS) \quad (3)$$

Figure 4:
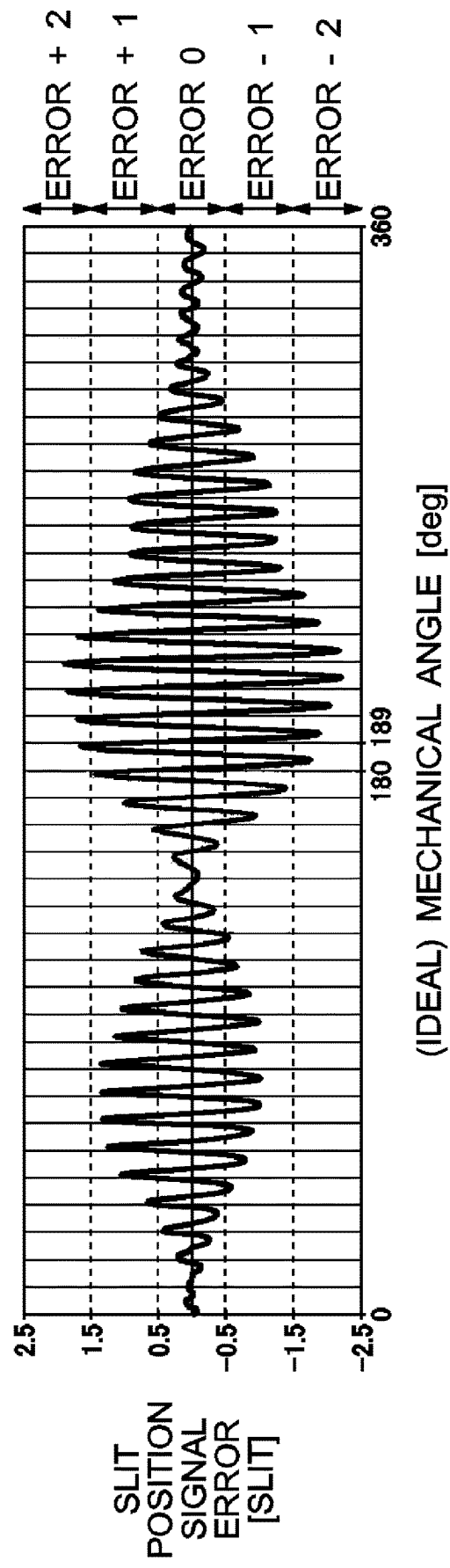
FIG. 4 illustrates an example of a slit position signal error for each ideal mechanical angle.

FIG. 4 illustrates an example of a slit position signal error for each ideal mechanical angle. In the present drawing, a case where the mobile body 100 has the track 105a and the track 105b in which the first number $N_M$=40 and the second number $N_N$=39 will be exemplified. In this case, in the track 105a, one slit cycle corresponds to a mechanical angle of 9 degrees (360≠40=9).

The slit position signal error in the present drawing is a value (error) obtained by subtracting the ideal value $S_{ideal}$ of the slit position signal SS at the ideal mechanical angle from the slit position signal SS actually output by the slit position signal calculation unit 130 when the position of the mobile body 100 is the ideal mechanical angle. As an example, such a slit position signal error can be measured by measuring an ideal mechanical angle including an ideal slit number $S_{ideal}$ by an ideal encoder (for example, an encoder used as a calibration reference of the encoder 110) while rotating the mobile body 100 in order to calibrate the position detection apparatus 10, and acquiring the slit position signal SS output from the slit position signal calculation unit 130. In the example of the present drawing, the slit position signal error exceeds the range of ±0.5 depending on the ideal mechanical angle.

Figure 5:
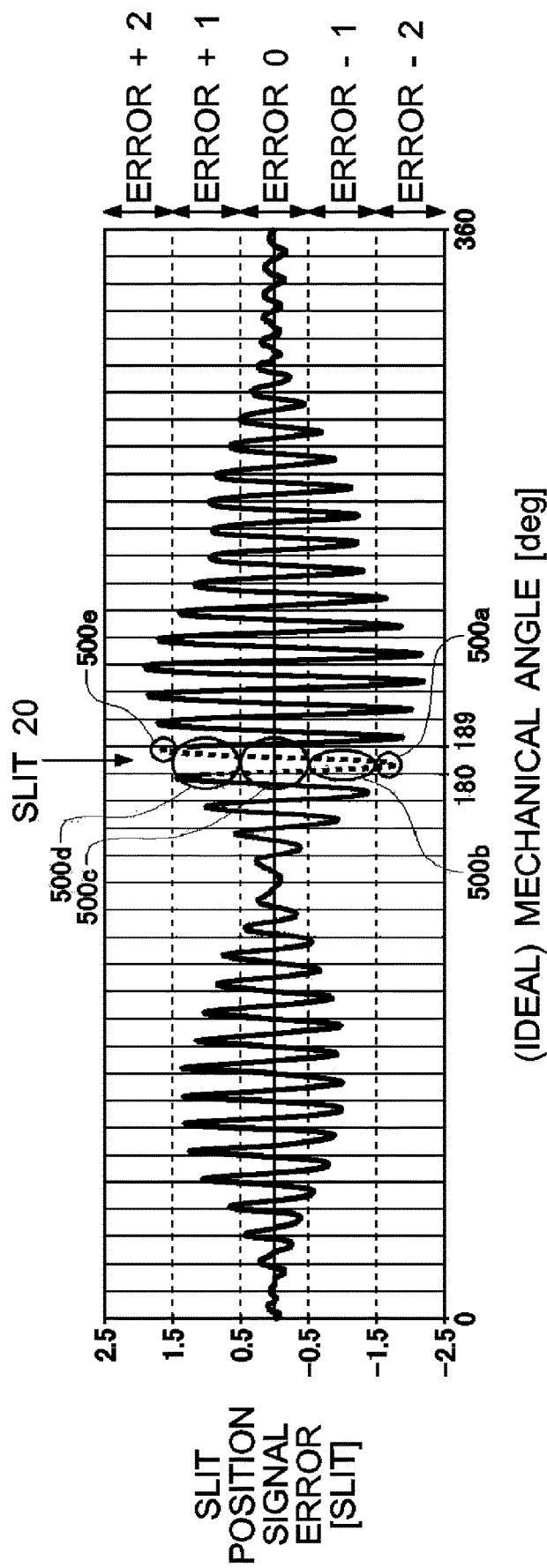
FIG. 5 illustrates an example of a slit position signal error for each ideal mechanical angle focusing on a slit number 20.

FIG. 5 illustrates an example of the slit position signal error for each ideal mechanical angle focusing on the slit number 20. The slit position signal error in the present drawing is similar to that in FIG. 4. The slit number 20 corresponds to a mechanical angle of 180 to 189 degrees. An error 500a (slit position signal error 500a) indicates that the slit number indicated by the slit position signal SS is smaller by 2 than the slit number 20 corresponding to the ideal mechanical angle. That is, the value of the slit position signal SS is within the range corresponding to the slit number 18 (for example, 17.5 or more and less than 18.5).

Similarly, an error 500b indicates that the slit number indicated by the slit position signal SS is within the range corresponding to the slit number 19 smaller by 1 than the slit number 20 corresponding to the ideal mechanical angle, an error 500c indicates that the slit number indicated by the slit position signal SS is the same as the slit number 20 corresponding to the ideal mechanical angle, an error 500d indicates that the slit number indicated by the slit position signal SS is within the range corresponding to the slit number 21 larger by 1 than the slit number 20 corresponding to the ideal mechanical angle, and an error 500e indicates that the slit number indicated by the slit position signal SS is within the range corresponding to the slit number 22 larger by 2 than the slit number 20 corresponding to the ideal mechanical angle. In this way, when the slit position signal error exceeds the range of ±0.5, the slit number indicated by the slit position signal SS is different from the ideal slit number.

Figure 6:
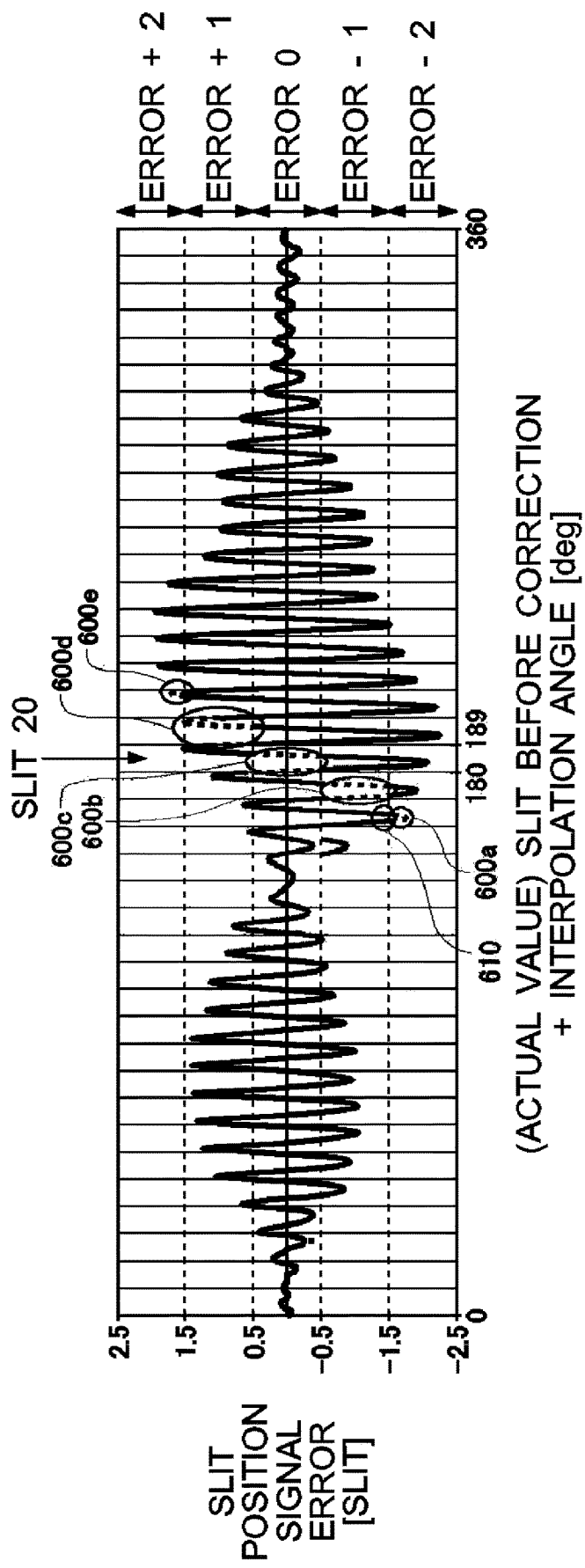
FIG. 6 illustrates an example of a slit position signal error for each measurement value of the mechanical angle focusing on an error value to correspond to the slit number 20 after correction.

FIG. 6 illustrates an example of the slit position signal error for each measurement value of the mechanical angle focusing on the error value to correspond to the slit number 20 after correction. FIG. 4 and FIG. 5 illustrate the slit position signal error acquired for each actual position of the mobile body 100 in the calibration of the position detection apparatus 10, whereas the present drawing illustrates what correction value $S_{cal}$ the position detection apparatus 10 after calibration should use for the slit position signal SS indicating the slit number for each detection position of the mobile body 100. Specifically, in actual use of the position detection apparatus 10, the slit number correction unit 160 indicates what correction value $S_{cal}$ should be used to correct the slit position signal SS.

The horizontal axis in the present drawing is a value corresponding to the mechanical angle before correction (that is, the detection position) obtained by adding the interpolation angle $\theta_M$ from the detection unit 120 to the slit number $S_M$ before correction from the slit number calculation unit 140. Here, the interpolation angle $\theta_M$ from the detection unit 120 is normalized to a range of 0 to 9 degrees by multiplying by $1/N_M$.

The slit number correction unit 160 adds the correction value $S_{cal}$ to the slit position signal SS from the slit position signal calculation unit 130 and rounds off the value to calculate the slit number $S'_M$ after correction (that is, the ideal value $S_{ideal}$ of the slit position signal). Therefore, while the slit position signal error is the slit position signal SS—the ideal value $S_{ideal}$, the correction value $S_{cal}$ is the ideal value $S_{ideal}$—the slit position signal SS. Therefore, the correction value $S_{cal}$ is a value obtained by reversing the positive and negative of the slit position signal error.

The error 500a in FIG. 5 corresponds to the slit number 18 according to the slit position signal SS. Therefore, when the measurement value of the mechanical angle is converted to the horizontal axis, the error 500a in FIG. 5 is shifted to the slit number 18 and becomes an error 600a overlapping with an error 610 originally present in the slit number 18. Similarly, the error 500b in FIG. 5 is shifted to the slit number 19 and becomes an error 600b overlapping with the slit position signal error originally present in the slit number 19, the error 500d in FIG. 5 is shifted to the slit number 21 and becomes an error 600d overlapping with the slit position signal error originally present in the slit number 21, and an error 500e in FIG. 5 is shifted to the slit number 22 and becomes an error 600e overlapping with the slit position signal error originally present in the slit number 22.

In this way, when the slit position signal SS is measured for each actual position (ideal mechanical angle) of the mobile body 100 to calculate the slit position signal error for each actual position, the slit position signal error is determined at one point for each actual position (FIG. 5). However, in a case where the slit position signal error exceeds the range of ±0.5 and the slit number indicated by the slit position signal SS is different from the slit number corresponding to the actual position of the mobile body 100, when conversion is performed into the slit position signal error for each detection position (slit number $S_M$+interpolation angle $\theta_M/N_M$) of the mobile body 100, two or more actual positions correspond to the same detection position, and as a result, two or more slit position signal errors can correspond to the same detection position.

Therefore, for the position detection apparatus 10 in which the slit position signal error is large and the measured slit number is different from the ideal slit number, two or more correction values (values obtained by reversing the positive and negative of the slit position signal error) appear for the same detection position. In such a case, which correction value the correction table 150 in the encoder 110 should be calibrated to output by the calibration apparatus of the position detection apparatus 10 becomes a problem.

Figure 7:
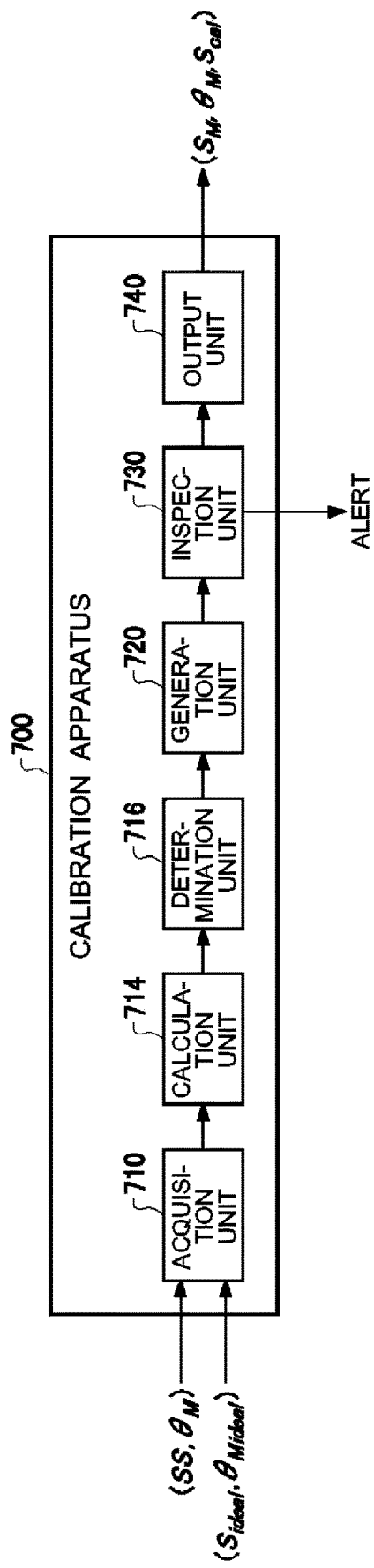
FIG. 7 illustrates a configuration of a calibration apparatus 700 according to the present embodiment.

FIG. 7 illustrates a configuration of the calibration apparatus 700 according to the present embodiment. The calibration apparatus 700 may be a computer such as a personal computer (PC), a workstation, a server computer, or a general purpose computer, or may be a computer system in which a plurality of computers are connected. Such a computer system is also a computer in a broad sense. The calibration apparatus 700 may also be implemented by one or more virtual computer environments executable in a computer. Alternatively, the calibration apparatus 700 may be a dedicated computer designed for calibration of the encoder 110, or may be dedicated hardware realized by a dedicated circuit. In a case where the calibration apparatus 700 is realized by a computer, the calibration apparatus 700 may function as each component illustrated in the present drawing by executing a calibration program.

The calibration apparatus 700 is connected to the encoder 110 to calibrate the encoder 110, for example, after manufacturing the position detection apparatus 10 and before shipping, or during inspection or diagnosis of the position detection apparatus 10. In this calibration, when two or more correction values appear for the same detection position of the mobile body 100, the calibration apparatus 700 sets an appropriate correction value in the encoder 110. The calibration apparatus 700 includes an acquisition unit 710, a calculation unit 714, a determination unit 716, a generation unit 720, an inspection unit 730, and an output unit 740.

The acquisition unit 710 acquires the detection position of the mobile body 100 for each actual position of the mobile body 100. Here, the acquisition unit 710 acquires $S_{ideal}$, which is an ideal value of the slit position signal SS and indicates the slit number of the actual position, and $\theta_{Mideal}$, which indicates the interpolation angle of the actual position, as the actual position of the mobile body 100 from a reference encoder which is attached to the mobile body 100 for calibration work and used as a calibration reference. The acquisition unit 710 acquires, from the encoder 110, the slit position signal SS that is output by the slit position signal calculation unit 130 and is obtained by detecting the slit position of the detection position, and the interpolation angle $\theta_M$ that has obtained by detecting the detection position by the detection unit 120a, as the detection position of the mobile body 100.

Instead of acquiring the slit position signal SS from the encoder 110, the acquisition unit 710 may acquire the interpolation angles $9_M$ and $9_N$ output from the detection units 120a and 120b in the encoder 110 as the detection position of the mobile body 100. The acquisition unit 710 may acquire a sin value indicating the sin voltage and a cos value indicating the cos voltage respectively detected by the detection units 120a and 120b as the detection position of the mobile body 100. In this case, the acquisition unit 710 may calculate the slit position signal SS similarly to the detection units 120a and 120b and the slit position signal calculation unit 130.

The calculation unit 714 is connected to the acquisition unit 710. Using the slit position signal SS, the calculation unit 714 calculates an error between the ideal slit number $S_{ideal}$ according to the actual position and the slit position signal SS for the detection position of each actual position of the mobile body 100. The determination unit 716 is connected to the calculation unit 714. The determination unit 716 determines whether two or more actual positions having at least partially different slit numbers in units of first slits correspond to the same detection position. The generation unit 720 is connected to the determination unit 716. The generation unit 720 generates the correction value $S_{cal}$ of the slit position signal SS for each detection position of the mobile body 100 using the calculated error. Here, in response to the fact that two or more actual positions having at least partially different slit numbers in units of first slits correspond to the same detection position, the generation unit 720 generates the correction value $S_{cal}$ for correcting an error by the magnitude between the errors at the two or more actual positions with respect to the slit position signal SS at the detection position.

The inspection unit 730 is connected to the generation unit 720. The inspection unit 730 inspects whether a mistake occurs in the slit number calculated using the slit position signal corrected with the correction value $S_{cal}$ generated by the generation unit 720. The inspection unit 730 may determine that no mistake occurs in the slit number when the difference between the slit position signal corrected with the correction value $S_{cal}$ generated by the generation unit 720 and the slit number $S_{ideal}$ corresponding to the actual position falls within a predefined reference range. This reference range may be, for example, a range of ±50% of the width of one slit number, or a range smaller than this range. The inspection unit 730 issues an alert in response to determining that a mistake occurs in the slit number. Note that the calibration apparatus 700 may not include the inspection unit 730 and may not have the inspection function of the correction value $S_{cal}$.

The output unit 740 outputs the correction value $S_{cal}$ for each inspection position which is generated by the generation unit 720. The output unit 740 may output the correction value $S_{cal}$ for each inspection position to the encoder 110. For example, the output unit 740 may write the correction value $S_{cal}$ for each inspection position in the correction table 150 included in the encoder 110. For example, the output unit 740 may store the correction value $S_{cal}$ for each inspection position in a storage device such as a memory or a hard disk drive.

Figure 8:
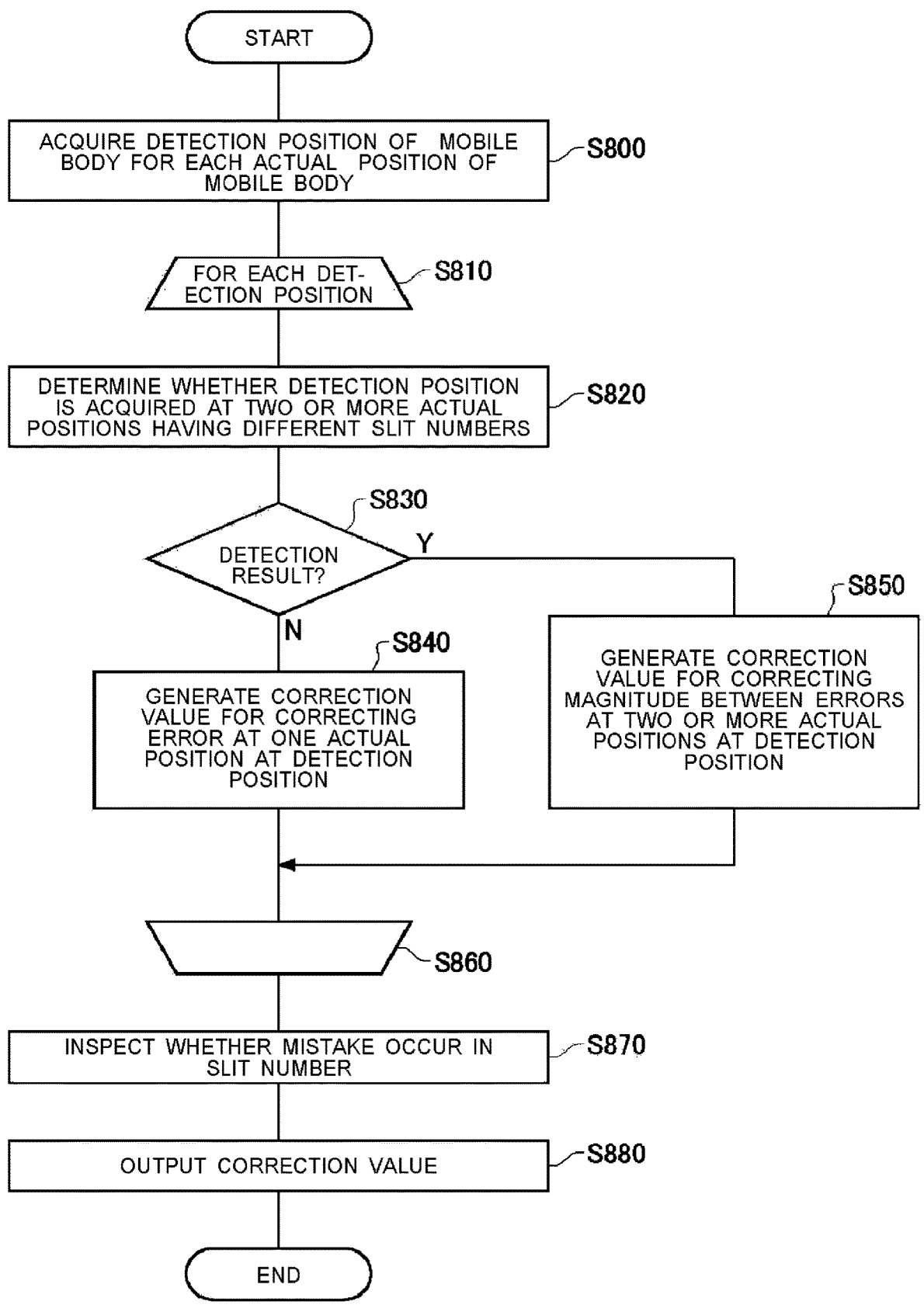
FIG. 8 illustrates an operation flow of the calibration apparatus 700 according to the present embodiment.

FIG. 8 illustrates an operation flow of the calibration apparatus 700 according to the present embodiment. In Step 800 (S800), the acquisition unit 710 acquires the detection position of the mobile body 100 for each actual position of the mobile body 100. The generation unit 720 converts the data format of data in which the detection position is associated with each actual position of the mobile body 100, and obtains data in which one or two or more actual positions are associated with each detection position of the mobile body 100.

The generation unit 720 repeats the processing from S810 to S860 for each detection position of the mobile body 100. In S820, the determination unit 716 determines whether two or more actual positions having at least partially different slit numbers in units of first slits correspond to the same detection position. In S820, the calculation unit 714 may calculate an error between the ideal slit number $S_{ideal}$ according to the actual position using the slit position signal SS and the slit position signal SS for the target detection position. In response to the fact that only one actual position corresponds to the target detection position ("N" in S830), the generation unit 720 generates the correction value $S_{cal}$ for correcting the error at the one actual position with respect to the slit position signal SS at the target detection position in S840. As a result, the generation unit 720 can generate the correction value $S_{cal}$ (for example, a correction value obtained by reversing the positive and negative of the slit position signal error) that cancels one slit position signal error for the detection position where the slit position signal error is within the range of ±0.5 and the slit position signal errors of other slit numbers do not overlap in the ideal mechanical angle. Note that, in generating the correction value $S_{cal}$, the generation unit 720 may generate the correction value $S_{cal}$ that completely cancels the error at one actual position, or may generate the correction value $S_{cal}$ that reduces the error at one actual position. For example, when the correction value for each detection position of the slit position signal SS is approximated by the correction function as described later, the correction amount for each detection position approximates, but does not necessarily coincide with, the error amount at one actual position for the detection position.

In response to the fact that two or more actual positions having at least partially different slit numbers correspond to the target detection position ("Y" in S830), the generation unit 720 generates the correction value $S_{cal}$ for correcting an error by the magnitude between the errors at the two or more actual positions with respect to the slit position signal SS at the detection position. As a result, in a case where there are two or more errors (for example, slit position signal errors) with respect to the same detection position, the generation unit 720 can unify these errors and generate an appropriate correction value $S_{cal}$.

When the correction value $S_{cal}$ for each detection position is generated in S870, the inspection unit 730 inspects whether a mistake occurs in the slit number calculated using the slit position signal corrected by the correction value $S_{cal}$ generated by the generation unit 720. Here, for each detection position, in a case where the slit position signal SS at the detection position is corrected with the correction value $S_{cal}$ corresponding to the detection position, the inspection unit 730 inspects whether the difference from the ideal slit number $S_{ideal}$ falls within the reference range at any of one or two or more actual positions corresponding to the detection position. The inspection unit 730 outputs an alert in response to the difference between the slit number of at least one actual position and the slit number indicated by the slit position signal after correction being outside the reference range at any detection position.

In S880, the output unit 740 outputs the correction value $S_{cal}$ for each inspection position generated by the generation unit 720. Here, when the alert is output in S870, the output unit 740 may interrupt the calibration process without outputting the correction value $S_{cal}$.

Figure 9:
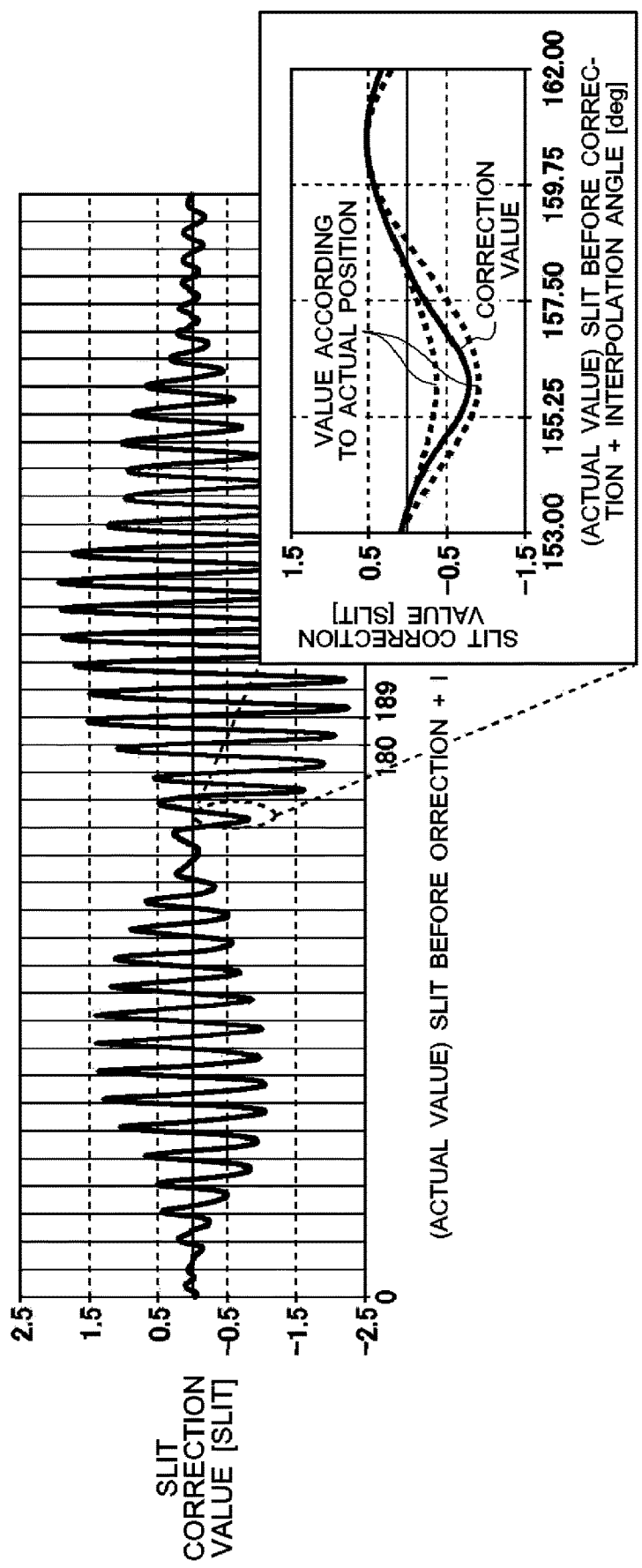
FIG. 9 illustrates an example of a correction value generated by the calibration apparatus 700.

FIG. 9 illustrates an example of the correction value $S_{cal}$ generated by the calibration apparatus 700. In FIG. 9, the horizontal axis represents the measurement value (detection position) of the mechanical angle, and the vertical axis represents the correction value $S_{cal}$ (slit correction value) generated by the generation unit 720. FIG. 9 illustrates the correction value $S_{cal}$ corresponding to the slit position signal error illustrated in FIG. 4 to FIG. 6. When the slit number correction unit 160 in the encoder 110 adds the correction value $S_{cal}$ to the slit position signal SS, the correction value $S_{cal}$ is a value obtained by inverting the positive and negative of the slit position signal error. However, in the present drawing, in order to be easily compared with FIG. 4 to FIG. 6, the correction value $S_{cal}$ is illustrated in a state where the positive and negative of the slit position signal error are not inverted.

Focusing on a section in which the measurement value (detection position) of the mechanical angle is 155.25 degrees to 157.50 degrees, in this section, two actual positions having different slit numbers correspond to each detection position. Therefore, at each detection position in this section, there is an error (slit position signal error) corresponding to each of the two actual positions. In this case, the generation unit 720 generates the correction value $S_{cal}$ for correcting an error in magnitude between the errors corresponding to the two actual positions. Here, the "magnitude between two errors" indicates a magnitude between two errors excluding both ends thereof, and means a magnitude between these two errors without adopting only one of the two errors.

For example, in response to the fact that the two or more actual positions correspond to the same detection position, the generation unit 720 generates the correction value $S_{cal}$ for correcting an error by a magnitude obtained by averaging the errors at the two or more actual positions with respect to the slit position signal SS. The generation unit 720 may adjust the correction value $S_{cal}$ for correcting an error by the magnitude between the errors at the two or more actual positions such that the error between the corrected slit position signal and the slit number at each of the two or more actual positions falls within the reference range.

Even when the measurement value (detection position) of the mechanical angle is in a range other than 153 degrees to 162 degrees, there is a portion where two actual positions having different slit numbers correspond to one detection position. In FIG. 9, illustration of the range other than 153 degrees to 162 degrees is omitted for the convenience of explanation.

Figure 10:
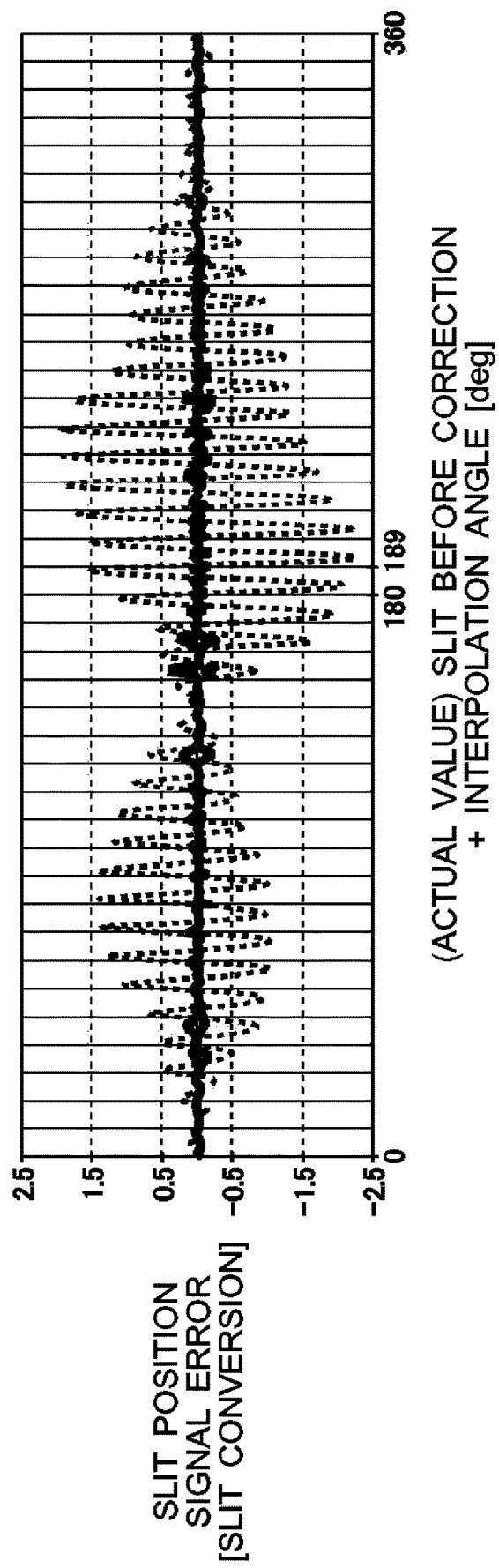
FIG. 10 illustrates an example of a slit position signal error after correction.

FIG. 10 illustrates an example of the slit position signal error after correction. In FIG. 10, the horizontal axis represents the measurement value (detection position) of the mechanical angle, and the vertical axis represents the slit position signal error (error) between the slit position signal SS and the slit number $S_{ideal}$ at each of one or two or more actual positions corresponding to each detection position. Here, a broken line indicates a slit position signal error before correction, and a solid line indicates a slit position signal error after correction of a magnitude obtained by averaging errors at two or more actual positions is performed.

As indicated by the solid line in the present drawing, the calibration apparatus 700 generates the correction value $S_{cal}$ for correcting an error by the magnitude between the errors at each of the two or more actual positions at each detection position, and thus the correction value $S_{cal}$ capable of correcting the slit position signal error illustrated in FIG. 4 to FIG. 6 can be output so that the error with respect to the slit number at each actual position falls within the range of ±0.5.

Note that the generation unit 720 described above generates the correction value $S_{cal}$ for each detection position. Alternatively, the generation unit 720 may generate the correction value for each section of the detection position acquired by the acquisition unit 710. For example, the generation unit 720 may generate the correction value $S_{cal}$ for each section obtained by dividing one cycle of the first slit (for example, for each 15° of the interpolation angle). In this case, the generation unit 720 may calculate the correction value $S_{cal}$ in the section by averaging the correction values for the respective detection positions calculated in the section.

The generation unit 720 may calculate a parameter of the correction function representing the correction value $S_{cal}$ for each section of the detection position acquired by the acquisition unit 710. For example, for each slit cycle of the first slit, the generation unit 720 may approximate the correction value $S_{cal}$ in the range of the interpolation angles of 0° to 360° in the slit cycle by a predefined correction function such as Fourier series expansion. In the case of using Fourier series expansion, the generation unit 720 may calculate correction factors (parameters) $A_k$ and $\delta_k$ of the correction function that approximates the correction value $S_{cal}$ at the interpolation angle $\theta_M$ with the correction value=$\Sigma_k A_k \times \sin(k\theta_M + \delta_k)$.

For example, the generation unit 720 may calculate the correction factor by calculating the correction value $S_{cal}$ corresponding to an interpolation angle of each predefined angle as a representative point and performing Fourier series expansion on a set of representative points. The output unit 740 writes the correction factor calculated by the generation unit 720 in the correction table 150. When receiving the slit number $S_M$ from the slit number calculation unit 140 in actual use, the slit number correction unit 160 may read the correction factor stored in the correction table 150 in association with the slit number $S_M$ and calculate the correction value $S_{cal}$ by the correction function using the correction factor.

Figure 11:
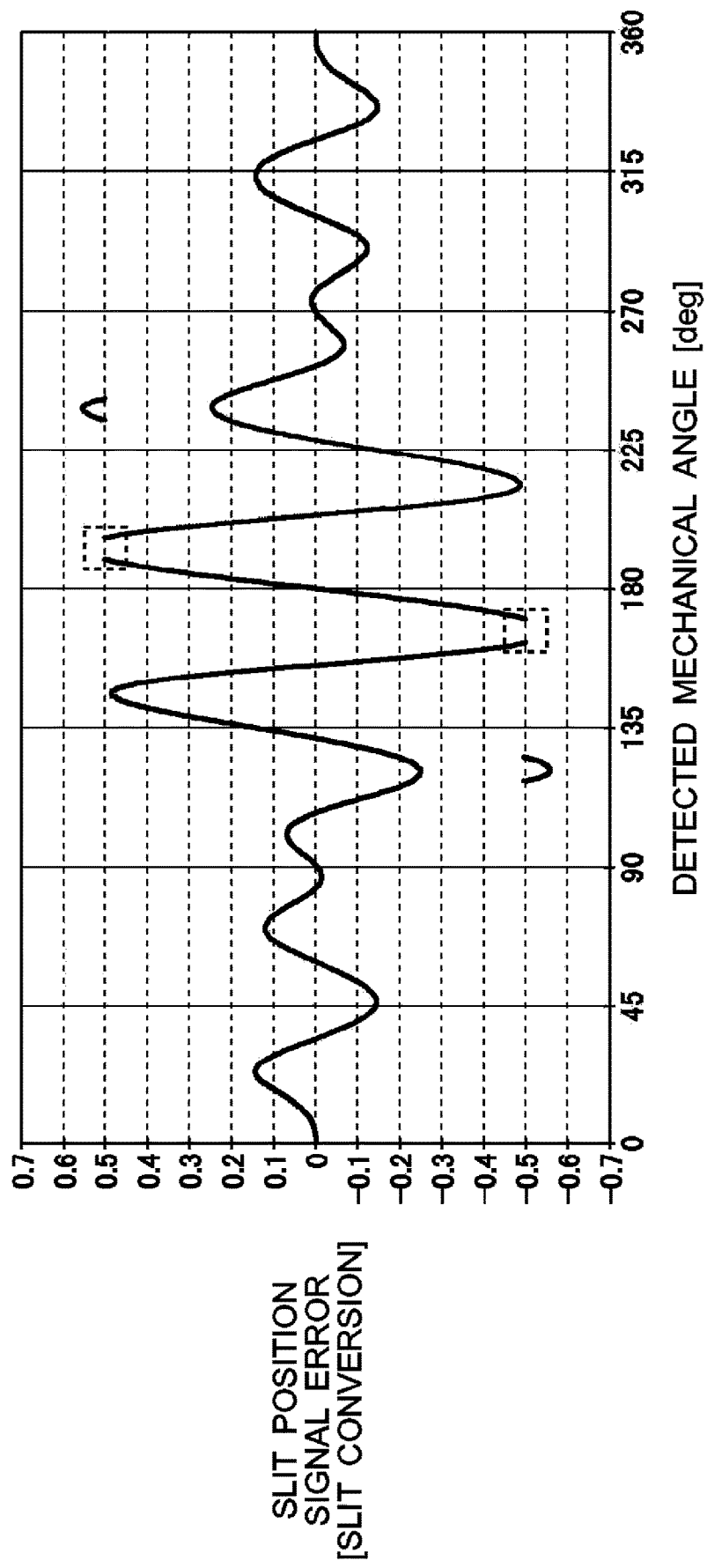
FIG. 11 illustrates an example in which a gap is generated in a correction value.

FIG. 11 illustrates an example in which a gap is generated in the correction value. As illustrated in FIG. 5 and FIG. 6, when the slit position signal error for each actual position is converted into the slit position signal error for each detection position, for example, the error 500a whose actual position is the slit number 20 is converted into the error 600a whose detection position is the slit number 18. As a result, there may be two or more slit position signal errors corresponding to two or more actual positions depending on the detection position.

Conversely, depending on the detection position, the slit position signal error may be allocated to another slit number, and as a result, the corresponding actual position may not exist. In the example of FIG. 11, in a case where there are eight cycles of the first slits per round of the mobile body 100 ($N_M$=8), the slit position signal error of 0.5 or more is shifted by +45° in the mechanical angle (detection position), and the slit position signal error of less than −0.5 is shifted by −45° in the mechanical angle. As a result, the actual position corresponding to the detection position does not exist in the portion surrounded by the broken line.

Here, since the detection position where the corresponding actual position does not exist is a position that has not been observed even when the actual position of the mobile body 100 is changed in the entire movable range in the calibration process, the detection position does not occur even in actual use as long as an error or the like different from that at the time of the calibration process does not occur. However, the position detection apparatus 10 may detect such a detection position due to a temporary error, fluctuation, or the like.

Figure 12:
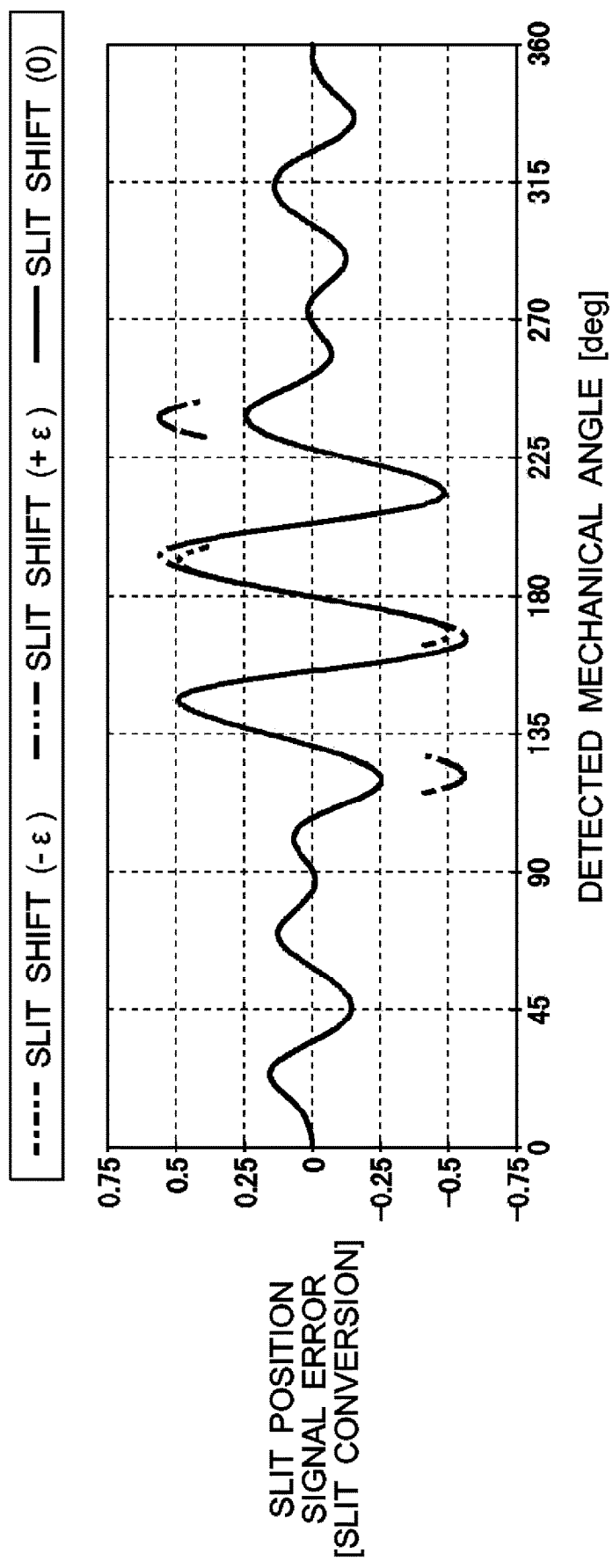
FIG. 12 illustrates an example of a method of interpolating a gap between the correction values according to the present embodiment.

FIG. 12 illustrates an example of a method of interpolating the gap between the correction values according to the present embodiment. When interpolating the gap between the correction values, the determination unit 716 may determine the correspondence relationship between the actual position and the detection position with a margin at the boundary of the first slit. Here, the generation unit 720 may generate the correction value, which includes a correspondence between the detection position obtained by performing at least one of addition or subtraction of a predefined margin on the boundary of the first slit with respect to the slit position signal and the actual position, at a certain detection position by using at least one actual position corresponding to the detection position. In the present embodiment, the generation unit 720 adds a value in which a slit number is specified by adding or subtracting a predefined margin ε to or from the slit position signal SS (that is, $S_M$=round (SS±ε)) in addition to a value in which the slit number $S_M$ is specified from the slit position signal SS (that is, $S_M$=round (SS)), and generates a correction value including these values. Here, the margin ε is a value smaller than the margin (0.5) used for specifying the slit number.

When the margin ε is subtracted from the slit position signal SS, in a case where the slit position signal error is positive, the slit position signal error does not move to another slit number until the slit position signal error becomes larger than the boundary (+0.5 or the like) of the slit number by +ε. On the other hand, in a case where the slit position signal error is negative, the slit position signal error moves to another slit number with a point where the slit position signal error is larger than the boundary (−0.5 or the like) of the slit number by ε as a boundary.

When the margin ε is added from the slit position signal SS, in a case where the slit position signal error is positive, the slit position signal error moves to another slit number with a point where the slit position signal error is smaller than the boundary (+0.5 or the like) of the slit number by ε as a boundary. On the other hand, in a case where the slit position signal error is negative, the slit position signal error does not move to another slit number until the slit position signal error becomes further smaller than the boundary (−0.5 or the like) of the slit number by ε.

In this way, by adding or subtracting the margin ε to or from the slit position signal SS to specify the slit number, as illustrated in FIG. 12, the slit position signal error can also be assigned to the detection position where the corresponding actual position does not exist. Then, the generation unit 720 can fill the gap between the correction values for each detection position by generating the correction value including these slit position signal errors.

Even when the detection position detected at the time of actual use of the calibration apparatus 700 fluctuates from the detection position detected at the time of calibration, and as a result, the slit position signal may fluctuate, the calibration apparatus 700 can prepare the correction value generated using the slit position signal error simulating such fluctuation in advance by adding or subtracting the margin ε to or from the slit position signal. As a result, the position detection apparatus 10 can use a robust correction value even in a case where the output of the sensor in each detection unit 120 fluctuates due to, for example, a change in environmental temperature during actual use.

Figure 13:
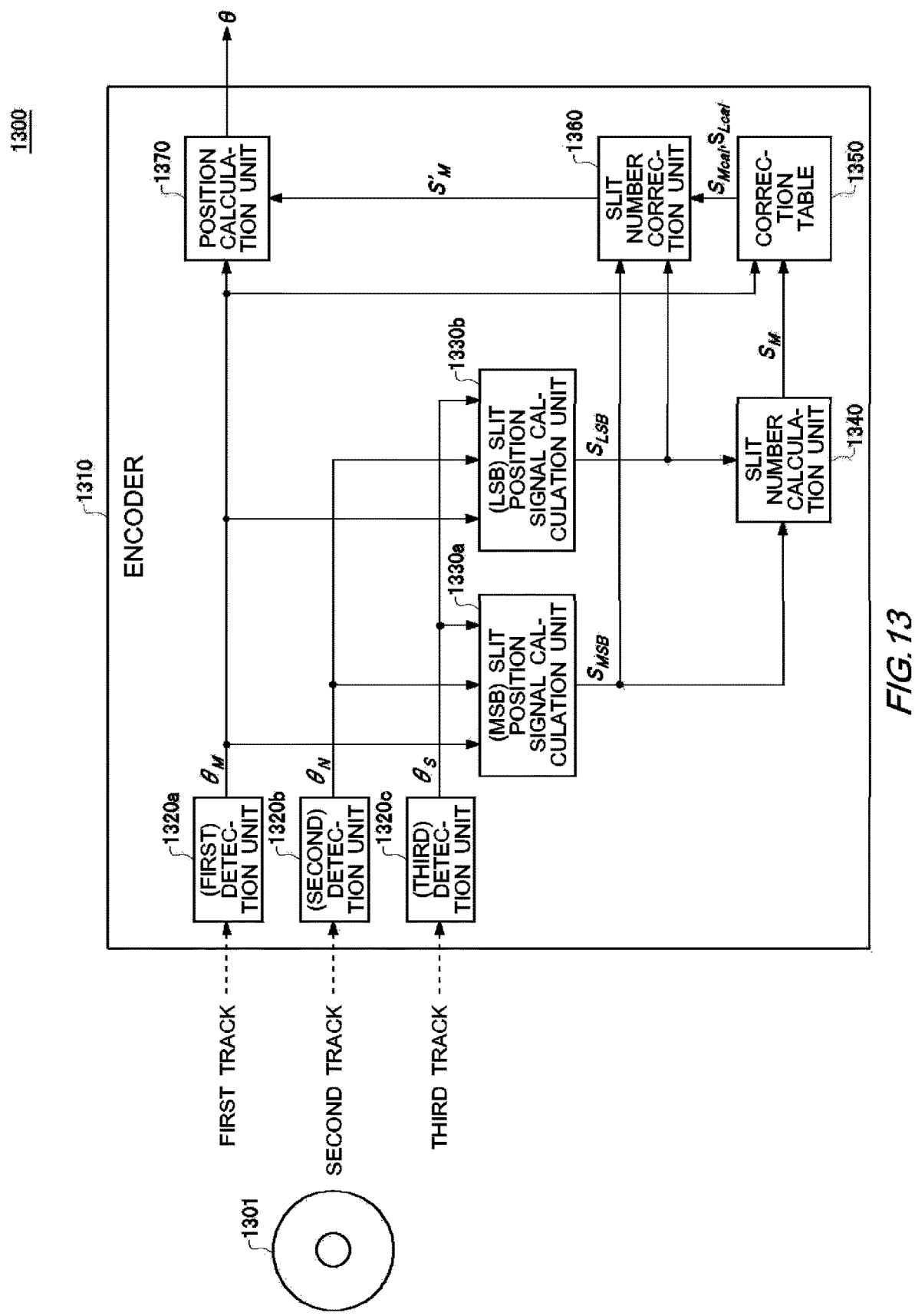
FIG. 13 illustrates a configuration of a position detection apparatus 1300 according to a modification of the present embodiment.

FIG. 13 illustrates a configuration of a position detection apparatus 1300 according to a modification of the present embodiment. Since the position detection apparatus 1300 is a modification of the position detection apparatus 10, the description thereof will be omitted except for the following difference. The position detection apparatus 1300 includes a mobile body 1301 and an encoder 1310. The mobile body 1301 is an object to be measured that is a target of position detection by the encoder 1310. Similarly to the mobile body 100, the mobile body 1301 includes a first track in which the number of slits per round of the mobile body 1301 is a first number $N_M$ and a second track in which the number of slits per round of the mobile body 1301 is a second number $N_N$. Then, the mobile body 1301 in the present modification further includes a third track including a third slit for each third cycle obtained by dividing one round of the mobile body 1301 by a third number $N_S$ different from the first number and the second number.

The encoder 1310 calculates a detection position of the mobile body 1301 on the basis of the three detection values detected from the three tracks of the mobile body 1301. The encoder 1310 includes a plurality of detection units 1320a to 1320c (also referred to as a "detection unit 1320"), a plurality of slit position signal calculation units 1330a and 1330b (also referred to as a "slit position signal calculation unit 1330"), a slit number calculation unit 1340, a correction table 1350, a slit number correction unit 1360, and a position calculation unit 1370.

Each of the detection units 1320a to 1320c is provided corresponding to each of the first to third tracks, and outputs a detection value detected from the corresponding track. In the present modification, the detection unit 1320a functions as a first detection unit, and detects and outputs a first detection value from the first track. The detection unit 1320b functions as a second detection unit, and detects and outputs a second detection value from the second track. The detection unit 1320c functions as a third detection unit, and detects and outputs a third detection value from the third track. Here, the detection units 1320a to 1320c respectively output (electric) interpolation angles $\theta_M$, $\theta_N$, and $\theta_S$ having one cycle(=360 degrees) between adjacent slits in the corresponding track as detection values. Each of the detection units 1320 is similar to the detection unit 120 in other points.

Each of the slit position signal calculation units 1330a and 1330b is connected to the plurality of detection units 1320. The slit position signal calculation unit 1330a outputs a first slit position signal $S_{MSB}$ using the plurality of detection values from the plurality of detection units 1320. In the present modification, the first slit position signal $S_{MSB}$ relates to an upper bit among the slit numbers of the first track. The slit position signal calculation unit 1330b outputs a second slit position signal $S_{LSB}$ using the plurality of detection values from the plurality of detection units 1320. In the present modification, the second slit position signal $S_{LSB}$ relates to the lower bit among the slit numbers of the first track.

For any combination of the first number $N_M$, the second number $N_N$, and the third number $N_S$ that can finally calculate the slit number $S_M$ of the first track, the first slit position signal $S_{MSB}$ and the second slit position signal $S_{MSB}$ can be generalized by the following Expressions (4) and (5).

$$S_{MSB} = \frac{p_M \theta_M + p_N \theta_N + p_s \theta_s}{360°} \quad (4)$$

$$S_{LSB} = \frac{q_M \theta_M + q_N \theta_N + q_S \theta_S}{360°} \quad (5)$$

Here, $p_M$, $p_N$, $p_S$, $q_M$, $q_N$, and $q_S$ are integer values determined so that the slit number $S_M$ of the first track can be finally calculated. For example, when the first number $N_M$=16, the second number $N_N$=15, and the third number $N_S$=12, $(p_M, p_N, p_S)$=(3, −4, 1) and $(q_M, q_N, q_S)$=(3, 0, −4) may be set. In this manner, each slit position signal calculation unit 1330 can calculate each slit position signal by weighting the plurality of detection values from the plurality of detection units 1320 with a predefined integer and calculating the sum.

The slit number calculation unit 1340 is connected to the plurality of slit position signal calculation units 1330. Using the slit position signals $S_{MSB}$ and $S_{LSB}$ output from the plurality of slit position signal calculation units 1330, the slit number calculation unit 1340 calculates the slit number $S_M$ (that is, the slit number of the slit in which the mobile body 1301 is located) in units of first slits of a predefined number. In the present modification, the slit number calculation unit 1340 calculates the slit number $S_M$ by the following Expression (6).

$$S_M = \mathrm{mod}(k^* \mathrm{round}(S_{MSB}) + \mathrm{round}(S_{LSB}), N_M) \quad (6)$$

Here, k is a positive integer value indicating the weight of the MSB. The slit number calculation unit 1340 can calculate the slit number in units of first slits by adding a value obtained by rounding off the second slit position signal $S_{LSB}$ in units of slit numbers to a value obtained by rounding off the first slit position signal $S_{MSB}$ in units of slit numbers of the significant digits and multiplying the value by the weight k of the MSB. The slit number calculation unit 1340 can calculate the slit number $S_M$ by normalizing the slit number to values from 0 to $N_M-1$.

Note that k can be uniquely determined according to the values of p and q so that the slit number $S_M$ can be calculated. For example, in a case where $(p_M, p_N, p_S)=(3, -4, 1)$ and $(q_M, q_N, q_S)=(0, 4, -5)$, k=5 may be set. A set of k, p, and q may be determined so as to satisfy relationships of $(p_M, p_N, p_S)=(3, -4, 1)$ and $(q_M, q_N, q_S)=(3, 0, -4)-(k-4)\times(p_M, p_N, p_S)$. Here, as the absolute value of q (the magnitude of the q vector) is smaller, a robust result is obtained with respect to a specific error of the slit, so that k=4 may be adopted from this viewpoint.

The detection position of the mobile body 1301 before the correction of the slit number is represented by a set of the slit number $S_M$ and the interpolation angle $\theta_M$. In the present modification, the mechanical angle $\theta_d$ as an example of the detection position is expressed by the above-described Expression (1) similarly to the encoder 110.

The correction table 1350 is connected to the detection unit 1320a and the slit number calculation unit 1340. The correction table 1350 stores, for each slit number, a set of a correction value $S_{Mcal}$ of the first slit position signal $S_{MSB}$ and a correction value $S_{Lcal}$ of the second slit position signal $S_{LSB}$ according to the first detection signal (interpolation angle $\theta_M$) detected from the first track. The correction table 1350 outputs the correction values $S_{Mcal}$ and $S_{Lcal}$ corresponding to the first detection signal among the sets of correction values associated with the slit number $S_M$ received from the slit number calculation unit 1340.

The slit number correction unit 1360 is connected to the plurality of slit position signal calculation units 1330 and the correction table 1350. The slit number correction unit 1360 corrects the plurality of slit position signals $S_{MSB}$ and $S_{LSB}$ received from the slit position signal calculation unit 1330 using the correction values $S_{Mcal}$ and $S_{Lcal}$ received from the correction table 150. Then, the slit number correction unit 160 calculates the slit number $S'_M$ after correction on the basis of the plurality of corrected slit position signals. In the present modification, the slit number correction unit 1360 calculates the slit number $S'_M$ after correction by the following Expression (7).

$$S'_M = \mathrm{mod}(k^* \mathrm{round}(S_{MSB}+S_{Mcal}) + \mathrm{round}(S_{LSB}+S_{Lcal}), N_M) \quad (7)$$

Note that Expression (7) is obtained by replacing the slit position signals $S_{MSB}$ and $S_{LSB}$ in Expression (6) with the slit position signals $S_{MSB}+S_{Mcal}$ and $S_{LSB}+S_{Lcal}$ after correction, respectively.

The position calculation unit 1370 is connected to the detection unit 1320a and the slit number correction unit 1360. The position calculation unit 1370 calculates the position (position after correction) of the mobile body 1301 in the same manner as the position calculation unit 170 in FIG. 1. In the present modification, the position calculation unit 1370 outputs the mechanical angle A, as a value indicating the position of the mobile body 1301, with one rotation of the mobile body 1301 as one cycle.

Figure 14:
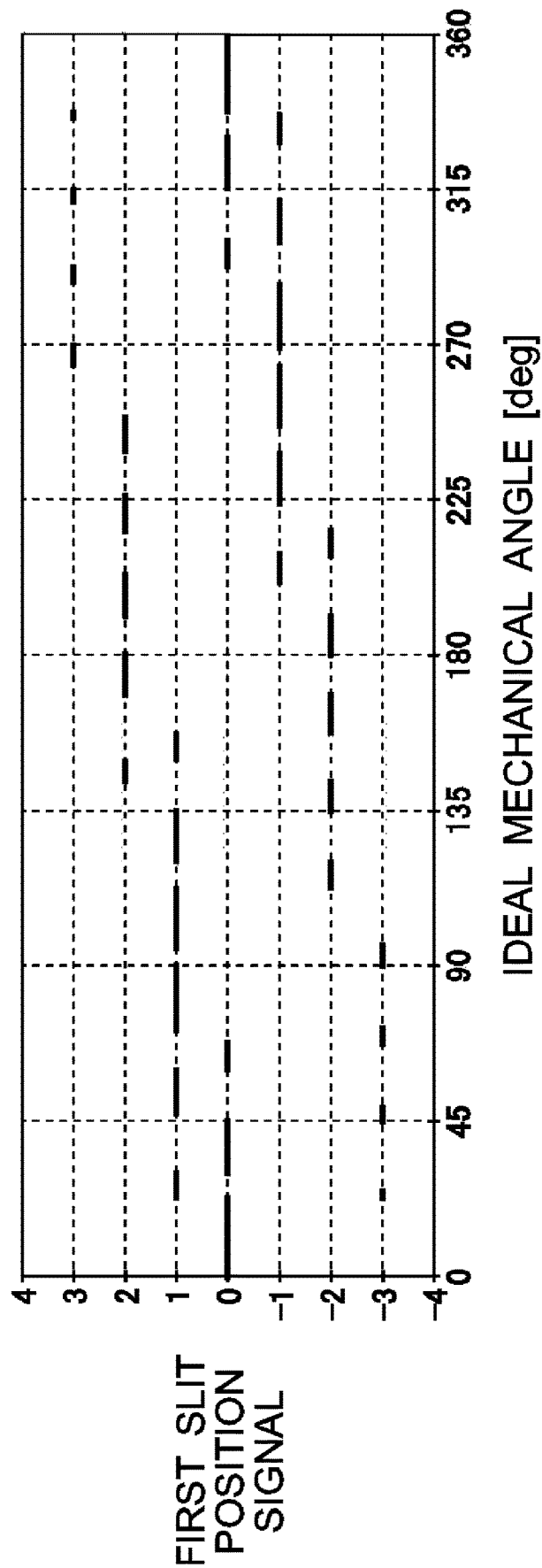
FIG. 14 illustrates an example of an ideal value of a first slit position signal $S_{MSB}$ according to a modification of the present embodiment.

FIG. 14 illustrates an example of an ideal value of the first slit position signal $S_{MSB}$ according to the modification of the present embodiment. The present drawing is obtained by plotting the first slit position signal $S_{MSB}$ shown in Expression (4) in a case where the first number $N_M=16$, the second number $N_N=15$, and the third number $N_S=12$, and $(p_M, p_N, p_S)=(3, -4, 1)$. The first slit position signal $S_{MSB}$ may change depending on the values of the factors $p_M$, $p_N$, and $p_S$, but in the present modification, the first slit position signal $S_{MSB}$ changes substantially corresponding to the significant digits of the slit number as illustrated in FIG. 14.

Figure 15:
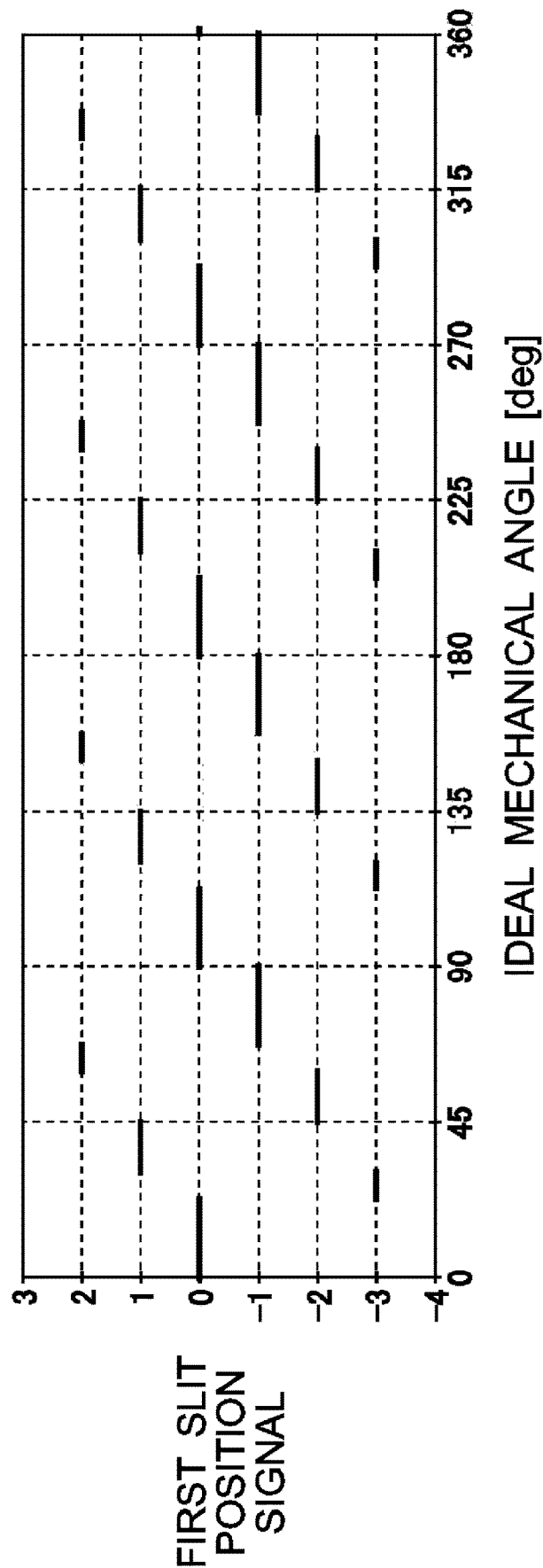
FIG. 15 illustrates an example of an ideal value of a second slit position signal $S_{LSB}$ according to a modification of the present embodiment.

FIG. 15 illustrates an example of an ideal value of the second slit position signal $S_{LSB}$ according to the modification of the present embodiment. The present drawing is obtained by plotting the second slit position signal $S_{LSB}$ shown in Expression (5) in a case where the first number $N_M=16$, the second number $N_N=15$, and the third number $N_S=12$, and $(q_M, q_N, q_S)=(3, 0, -4)$. The second slit position signal $S_{LSB}$ may change depending on the values of the coefficients $q_M$, $q_N$, and $q_S$, but in the present modification, the second slit position signal $S_{LSB}$ changes substantially corresponding to the less significant digits of the slit number as illustrated in FIG. 15.

Figure 16:
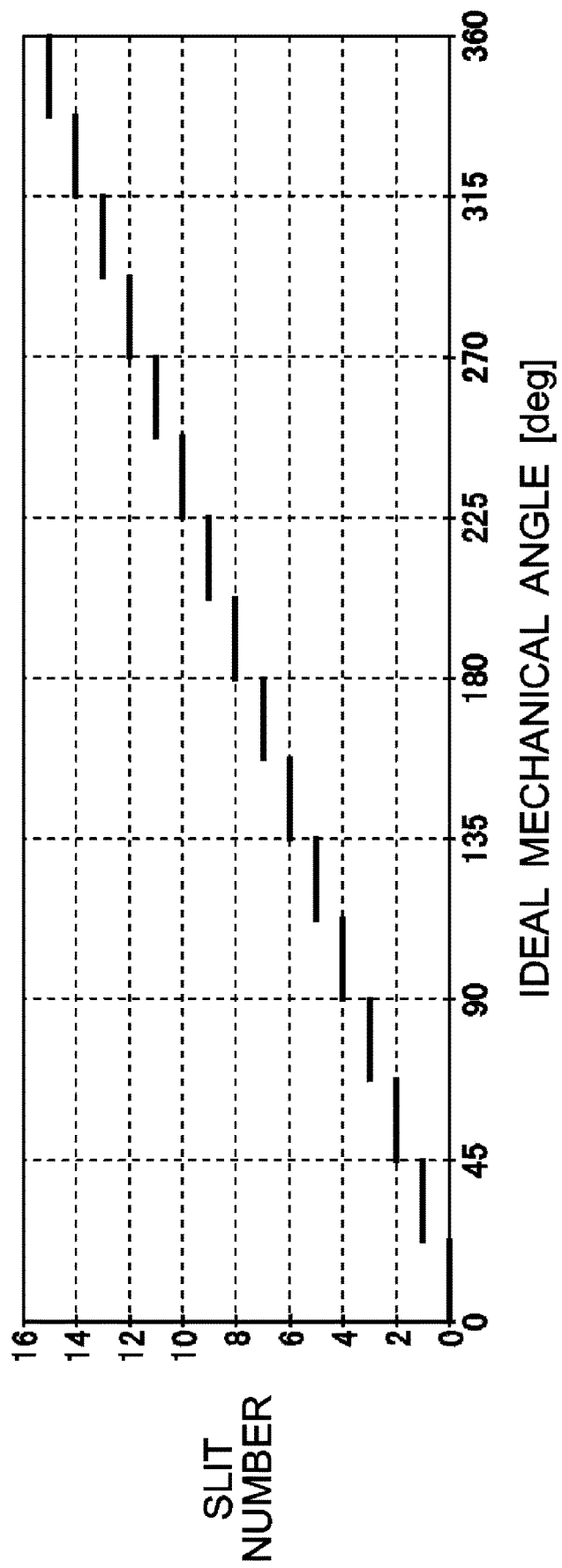
FIG. 16 illustrates an example of an ideal value of a slit number according to a modification of the present embodiment.

FIG. 16 illustrates an example of an ideal value of the slit number according to the modification of the present embodiment. The present drawing is obtained by plotting the slit number $S_M$ shown in Expression (6) using the first slit position signal $S_{MSB}$ illustrated in FIG. 14 and the second slit position signal $S_{LSB}$ illustrated in FIG. 15. In the present modification, by using the first slit position signal $S_{MSB}$ illustrated in FIG. 14 and the second slit position signal $S_{LSB}$ illustrated in FIG. 15, the slit number in which the slit number increases by 1 from 0 to 15 (that is, $N_M-1$) is obtained every time the ideal mechanical angle of the mobile body 1301 changes by 22.5° (that is, 360°/$N_M$) from 0° to 360°.

Next, calibration of the position detection apparatus 1300 illustrated in FIG. 13 to FIG. 16 will be described. In the present modification, the calibration apparatus 700 may generate each of the correction value $S_{Mcal}$ of the first slit position signal $S_{MSB}$ and the correction value $S_{Lcal}$ of the second slit position signal $S_{LSB}$, similarly to the generation of the correction value $S_{cal}$ of the slit position signal SS as illustrated in FIG. 7 and FIG. 8. More specifically, the acquisition unit 710 acquires the detection position of the mobile body 1301 for each actual position of the mobile body 1301, similarly to S800 of FIG. 8.

Here, the acquisition unit 710 acquires, as the value indicating the actual position of the mobile body 1301, $S_{MSBideal}$ indicating the ideal value of the first slit position signal $S_{MSB}$ and the value corresponding to the significant digits of the slit number of the actual position, $S_{LSBideal}$ indicating the ideal value of the second slit position signal $S_{LSB}$ and the value corresponding to the less significant digits of the slit number of the actual position, and $\theta_{Mideal}$ indicating the interpolation angle of the actual position from the encoder used as a calibration reference. The acquisition unit 710 acquires the first slit position signal $S_{MSB}$, the second slit position signal $S_{LSB}$, and the interpolation angle $\theta_M$ from the encoder 1310 as detection positions of the mobile body 1301. The generation unit 720 converts the data format of data in which the detection position is associated with each actual position of the mobile body 1301, and obtains data in which one or two or more actual positions are associated with each detection position of the mobile body 1301.

Similarly to FIG. 8, the calculation unit 714, the determination unit 716, and the generation unit 720 repeat the processing from S810 to S860 for each of the first slit position signal $S_{MSB}$ and the second slit position signal $S_{LSB}$ for each detection position of the mobile body 1301.

With respect to the first slit position signal $S_{MSB}$, the determination unit 716 determines whether two or more actual positions in which the slit numbers of the significant digits serving as the unit of the first slit position signal $S_{MSB}$ are at least partially different correspond to the same detection position, similarly to S820 of FIG. 8. In response to the fact that only one actual position corresponds to the target detection position ("N" in S830), the generation unit 720 generates the correction value $S_{Mcal}$ for correcting the first slit position signal $S_{MSB}$ by an error (that is, $S_{MSB}-S_{MSBideal}$) at the one actual position at the detection position, similarly to S840. In response to the fact that two or more actual positions having at least partially different slit numbers correspond to the target detection position ("Y" in S830), the generation unit 720 generates the correction value $S_{Mcal}$ for correcting an error by the magnitude between the errors at the two or more actual positions at the detection position, similarly to S850. As for the second slit position signal $S_{LSB}$, the generation unit 720 generates the correction value $S_{Lcal}$ at the target detection position in the same manner as described above.

When the correction value for each detection position is generated, the inspection unit 730 inspects whether a mistake occurs in the upper slit number calculated using the slit position signal corrected by the correction value $S_{Mcal}$ generated by the generation unit 720 with respect to the first slit position signal $S_{MSB}$, similarly to S870 of FIG. 8. In addition, the inspection unit 730 inspects whether a mistake occurs in the lower slit number calculated using the slit position signal corrected by the correction value $S_{Lcal}$ generated by the generation unit 720 with respect to the second slit position signal $S_{LSB}$.

The output unit 740 outputs the correction value for each inspection position and each of the first and second slit position signals generated by the generation unit 720, similarly to S880 in FIG. 8.

The calibration apparatus 700 according to the present modification can generate the correction value for appropriately correcting the track number in the encoder 1310 that detects the position of mobile body 1301 using the mobile body 1301 having three tracks. Similarly, the calibration apparatus 700 can output a correction value for correcting each of one or a plurality of slit position signals calculated by a weighted sum of a plurality of detection values detected from a plurality of tracks also for an encoder that detects a position of a mobile body having four or more tracks.

Various embodiments of the present invention may also be described with reference to flowcharts and block diagrams, where the blocks may represent (1) a stage of processing in which an operation is performed or (2) a section of a device that is responsible for performing the operation. Certain stages and sections may be implemented by dedicated circuitry, programmable circuitry provided with computer readable instructions stored on a computer readable medium, and/or a processor provided with computer readable instructions stored on a computer readable medium. The dedicated circuitry may include digital and/or analog hardware circuits, and may include integrated circuits (ICs) and/or discrete circuits. The programmable circuitry may include reconfigurable hardware circuits including memory elements such as logic AND, logic OR, logic XOR, logic NAND, logic NOR, and other logic operations, flip-flops, registers, field programmable gate arrays (FPGA), programmable logic arrays (PLA), and the like.

The computer readable medium may include any tangible device capable of storing instructions for execution by a suitable device, so that the computer readable medium having the instructions stored therein will have a product including instructions that can be executed to create means for performing the operations designated in flowcharts or block diagrams. Examples of the computer readable medium may include an electronic storage medium, a magnetic storage medium, an optical storage medium, an electromagnetic storage medium, a semiconductor storage medium, and the like. More specific examples of the computer readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

The computer readable instructions may include source code or object code written in any combination of one or more programming languages, including assembler instructions, instruction-set-architecture (ISA) instructions, machine instructions, machine-dependent instructions, microcode, firmware instructions, state-setting data, or an object oriented programming language such as JAVA (registered trademark), C++, Smalltalk (registered trademark), or the like, and conventional procedural programming languages such as the "C" programming language or similar programming languages.

The computer readable instructions may be provided for a processor or programmable circuitry of a general purpose computer, special purpose computer, or other programmable data processing devices such as a computer locally or via a wide area network (WAN) such as a local area network (LAN), the Internet, or the like, and execute the computer readable instructions to create means for executing the operations designated in flowcharts or block diagrams. Examples of the processor include a computer processor, a processing unit, a microprocessor, a digital signal processor, a controller, a microcontroller, and the like.

Figure 17:
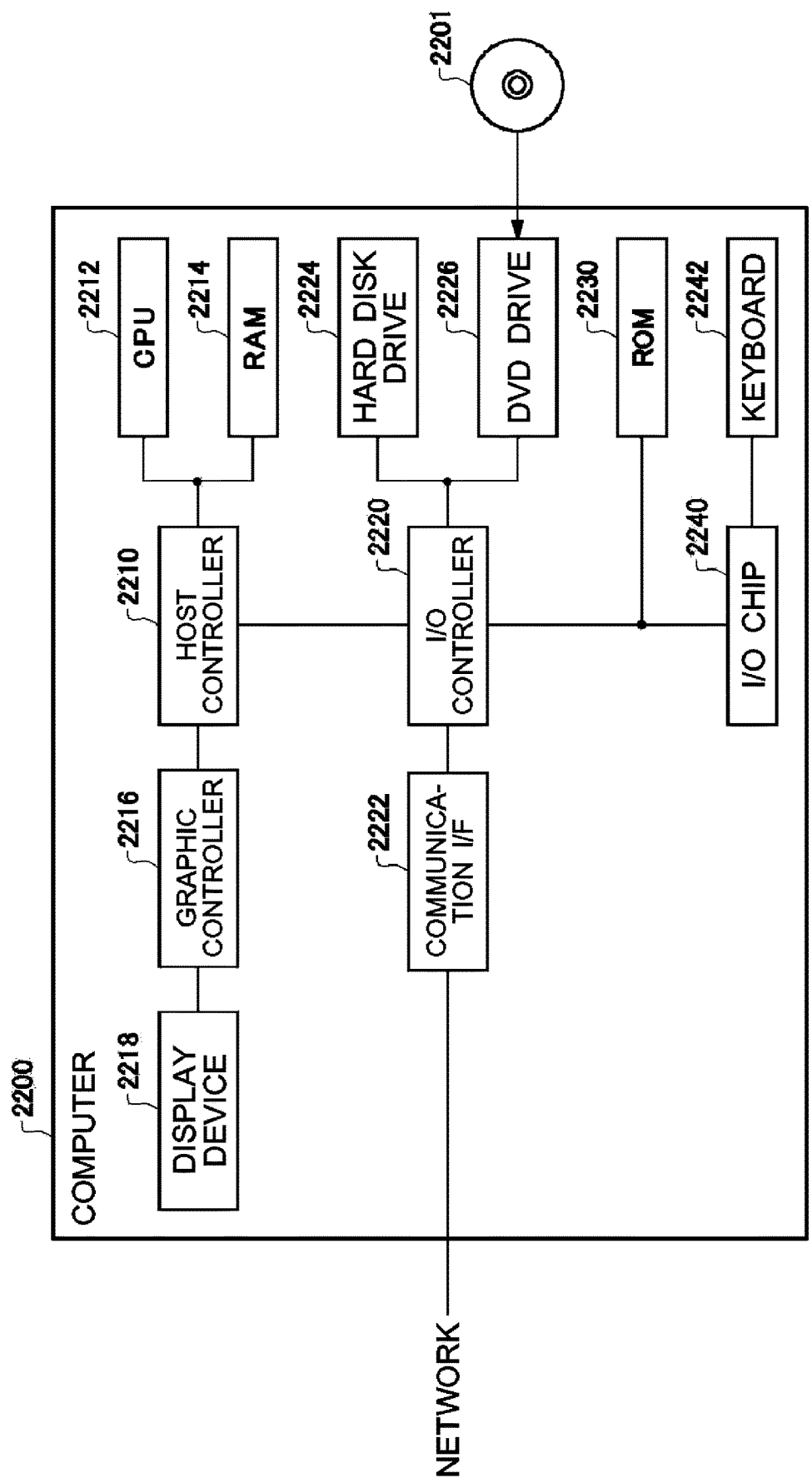
FIG. 17 illustrates an example of a computer 2200 in which a plurality of aspects of the present invention may be embodied in whole or in part.

FIG. 17 illustrates an example of a computer 2200 in which a plurality of aspects of the present invention may be embodied in whole or in part. A program installed in the computer 2200 may cause the computer 2200 to function as an operation associated with the apparatuses according to the embodiments of the present invention or as one or more sections of the apparatuses, or may cause the operation or the one or more sections to be executed, and/or may cause the computer 2200 to execute a process according to the embodiments of the present invention or a stage of the process. Such programs may be executed by a CPU 2212 to cause the computer 2200 to perform certain operations associated with some or all of the blocks in the flowcharts and block diagrams described in the present specification.

The computer 2200 according to the present embodiment includes the CPU 2212, a RAM 2214, a graphic controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphic controller 2216 acquires image data generated by the CPU 2212 in a frame buffer or the like provided in the RAM 2214 or in itself, such that the image data is displayed on the display device 2218.

The communication interface 2222 communicates with other electronic devices via a network. The hard disk drive 2224 stores programs and data used by the CPU 2212 in the computer 2200. The DVD-ROM drive 2226 reads a program or data from the DVD-ROM 2201 and provides the program or data to the hard disk drive 2224 via the RAM 2214. The IC card drive reads programs and data from the IC card, and/or writes programs and data to the IC card.

The ROM 2230 stores therein boot programs and the like executed by the computer 2200 at the time of activation, and/or programs that depend on the hardware of the computer 2200. The input/output chip 2240 may also connect various input/output units to the input/output controller 2220 via parallel ports, serial ports, keyboard ports, mouse ports, or the like.

The program is provided by a computer readable medium such as the DVD-ROM 2201 or the IC card. The program is read from a computer readable medium, installed in the hard disk drive 2224, the RAM 2214, or the ROM 2230 which are also examples of the computer readable medium, and executed by the CPU 2212. The information processing described in these programs is read by the computer 2200 and provides cooperation between the programs and various types of hardware resources. The apparatus or method may be configured by implementing operations or processing of information according to use of the computer 2200.

For example, in a case where communication is performed between the computer 2200 and an external device, the CPU 2212 may execute a communication program loaded in the RAM 2214 and instruct the communication interface 2222 to perform communication processing on the basis of a process described in the communication program. Under the control of the CPU 2212, the communication interface 2222 reads transmission data stored in a transmission buffer processing area provided in a recording medium such as the RAM 2214, the hard disk drive 2224, the DVD-ROM 2201, or the IC card, transmits the read transmission data to the network, or writes reception data received from the network in a reception buffer processing area or the like provided on the recording medium.

In addition, the CPU 2212 may cause the RAM 2214 to read all or a necessary part of a file or database stored in an external recording medium such as the hard disk drive 2224, the DVD-ROM drive 2226 (DVD-ROM 2201), the IC card, or the like, and may execute various types of processing on data on the RAM 2214. Next, the CPU 2212 writes back the processed data to the external recording medium.

Various types of information such as various types of programs, data, tables, and databases may be stored in a recording medium and subjected to information processing. The CPU 2212 may execute various types of processing on the data read from the RAM 2214, including various types of operations, information processing, conditional determination, conditional branching, unconditional branching, information retrieval/replacement, and the like, which are described throughout the present disclosure and designated by a command sequence of a program, and writes back the results to the RAM 2214. Further, the CPU 2212 may retrieve information in a file, a database, or the like in the recording medium. For example, in a case where a plurality of entries each having the attribute value of a first attribute associated with the attribute value of a second attribute is stored in the recording medium, the CPU 2212 may retrieve the plurality of entries for an entry matching the condition in which the attribute value of the first attribute is designated, read the attribute value of the second attribute stored in the entry, and thereby acquire the attribute value of the second attribute associated with the first attribute satisfying the predefined condition.

The programs or software modules described above may be stored in a computer readable medium on or near the computer 2200. In addition, a recording medium such as a hard disk or a RAM provided in a server system connected to a dedicated communication network or the Internet can be used as a computer readable medium, thereby providing a program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: position detection apparatus
100: mobile body
105a and 105b: track
110: encoder
120a and 120b: detection unit
130: slit position signal calculation unit
140: slit number calculation unit
150: correction table
160: slit number correction unit
170: position calculation unit
500a to 500e: error
600a to 600e: error
610: error
700: calibration apparatus
710: acquisition unit
714: calculation unit 716: determination unit
720: generation unit
730: inspection unit
740: output unit
1300: position detection apparatus
1301: mobile body
1310: encoder
1320a and 1320b: detection unit
1330: slit position signal calculation unit
1340: slit number calculation unit
1350: correction table
1360: slit number correction unit
1370: position calculation unit
2200: computer
2201: DVD-ROM
2210: host controller
2212: CPU
2214: RAM
2216: graphic controller
2218: display device
2220: input/output controller
2222: communication interface
2224: hard disk drive
2226: DVD-ROM drive
2230: ROM
2240: input/output chip
2242: keyboard

What is claimed is:

1. An apparatus for position detection comprising:
a signal processing circuit; and
a storage device, wherein
the signal processing circuit performs the following processes:
acquiring a first detection value from sensor data relating to a first slit row provided in a mobile body;
acquiring a second detection value from sensor data relating to a second slit row provided in the mobile body;
calculating a slit position signal based on the first detection value and the second detection value;
calculating a first slit number based on the slit position signal;
acquiring, from the storage device, a predetermined correction value that corrects the slit position signal, based on detection result of the first detection value and the first slit number;
applying the correction value to the slit position signal, and acquiring the first slit number after correction based on the slit position signal after correction;
deriving a position of the mobile body based on the first slit number after correction and the first detection value; wherein
the correction value is determined by performing the following processes:
(1) acquiring a reference slit position signal at each of a plurality of inspection positions in a moving range of the mobile body, and deciding ideal slit numbers corresponding to each of the plurality of inspection positions based on each reference slit position signal;
(2) acquiring the slit position signals at each of the plurality of inspection positions, detecting a detection position based on the slit position signals, and acquiring an error of the slit position signal with respect to the reference slit position signal at each of the plurality of inspection positions; and
(3) for each detection position acquired by step (2), generating the correction value based on any value between a maximum value and a minimum value of two or more errors associated with the detection position, for the detection position in which the ideal slit numbers are acquired at different two or more inspection positions.

2. The apparatus for position detection according to claim 1, wherein the correction value is further determined by performing the following process for each detection position acquired by step (2):
generating the correction value based on error associated with the detection position, for the detection position in which the ideal slit number is acquired at one inspection position only.

3. The apparatus for position detection according to claim 2, wherein
the mobile body is a rotating body,
the rotating body includes:
a first track including a first slit in each first cycle obtained by dividing one round of the rotating body by a predefined first number; and
a second track including a second slit in each second cycle obtained by dividing one round of the rotating body by a second number smaller than the first number, and
an encoder to be calibrated is configured to calculate a detection position of the mobile body on a basis of the first detection value detected from the first track and the second detection value detected from the second track.

4. The apparatus for position detection according to claim 1, wherein
a correction value for each section of an acquired detection position is generated.

5. The apparatus for position detection according to claim 4, wherein
the mobile body is a rotating body,
the rotating body includes:
a first track including a first slit in each first cycle obtained by dividing one round of the rotating body by a predefined first number; and
a second track including a second slit in each second cycle obtained by dividing one round of the rotating body by a second number smaller than the first number, and
an encoder to be calibrated is configured to calculate a detection position of the mobile body on a basis of the first detection value detected from the first track and the second detection value detected from the second track.

6. The apparatus for position detection according to claim 1, wherein
a parameter of a correction function representing a correction value corresponding to a detection position for each section of the acquired detection position is calculated.

7. The apparatus for position detection according to claim 6, wherein
a parameter of the correction function by performing Fourier series expansion of a set of correction values corresponding to a detection position for each section of the acquired detection position is calculated.

8. The apparatus for position detection according to claim 7, wherein
the mobile body is a rotating body,
the rotating body includes:
a first track including a first slit in each first cycle obtained by dividing one round of the rotating body by a predefined first number; and a second track including a second slit in each second cycle obtained by dividing one round of the rotating body by a second number smaller than the first number, and an encoder to be calibrated is configured to calculate a detection position of the mobile body on a basis of the first detection value detected from the first track and the second detection value detected from the second track.

9. The apparatus for position detection according to claim 6, wherein
the mobile body is a rotating body,
the rotating body includes:
a first track including a first slit in each first cycle obtained by dividing one round of the rotating body by a predefined first number; and
a second track including a second slit in each second cycle obtained by dividing one round of the rotating body by a second number smaller than the first number, and
an encoder to be calibrated is configured to calculate a detection position of the mobile body on a basis of the first detection value detected from the first track and the second detection value detected from the second track.

10. The apparatus for position detection according to claim 1, wherein
in response to two or more inspection positions corresponding to a same detection position, a correction value for correcting an error by a magnitude obtained by averaging errors at the two or more inspection positions with respect to the slit position signal is generated.

11. The apparatus for position detection according to claim 1, wherein
a correspondence relationship between an inspection position and a detection position with a margin at a boundary of a first slit is determined.

12. The apparatus for position detection according to claim 11, wherein
a correction value, which includes a correspondence between a detection position obtained by performing at least one of addition or subtraction of a predefined margin to or from a boundary of the first slit with respect to the slit position signal and an inspection position, using at least one inspection position corresponding to the detection position is generated.

13. The apparatus for position detection according to claim 1, further comprising:
a correction value to an encoder that calculates a slit number in units of first slits by rounding off a value obtained by adding the correction value to the slit position signal is outputted.

14. The apparatus for position detection according to claim 13, wherein
the encoder calculates a slit number obtained by rounding off a value obtained by adding a correction value to the slit position signal so that the value becomes an integer.

15. The apparatus for position detection according to claim 13, wherein
the output unit writes a correction value in a correction table included in the encoder.

16. The apparatus for position detection according to claim 13, further comprising:
whether a mistake occurs in a slit number calculated using a slit position signal corrected by a correction value generated by the generation unit is determined by inspection.

17. The apparatus for position detection according to claim 1, wherein
the mobile body is a rotating body,
the rotating body includes:
a first track including a first slit in each first cycle obtained by dividing one round of the rotating body by a predefined first number; and
a second track including a second slit in each second cycle obtained by dividing one round of the rotating body by a second number smaller than the first number, and
an encoder to be calibrated is configured to calculate a detection position of the mobile body on a basis of the first detection value detected from the first track and the second detection value detected from the second track.

18. The apparatus for position detection according to claim 17, wherein
the rotating body further includes a third track including a third slit for each third cycle obtained by dividing one round of the rotating body by a third number different from the first number and the second number, and
the encoder is configured to calculate a detection position of the mobile body further on a basis of a third detection value detected from the third track.

19. A method for position detection comprising:
acquiring a first detection value from sensor data relating to a first slit row provided in a mobile body;
acquiring a second detection value from sensor data relating to a second slit row provided in the mobile body;
calculating a slit position signal based on the first detection value and the second detection value;
calculating a first slit number based on the slit position signal;
acquiring, from the storage device, a predetermined correction value that corrects the slit position signal, based on detection result of the first detection value and the first slit number;
applying the correction value to the slit position signal, and acquiring the first slit number after correction based on the slit position signal after correction;
deriving a position of the mobile body based on the first slit number after correction and the first detection value; wherein
the correction value is determined by performing the following processes:
(1) acquiring a reference slit position signal at each of a plurality of inspection positions in a moving range of the mobile body, and deciding ideal slit numbers corresponding to each of the plurality of inspection positions based on each reference slit position signal;
(2) acquiring the slit position signals at each of the plurality of inspection positions, detecting a detection position based on the slit position signals, and acquiring an error of the slit position signal with respect to the reference slit position signal at each of the plurality of inspection positions; and
(3) for each detection position acquired by step (2), generating the correction value based on any value between a maximum value and a minimum value of two or more errors associated with the detection position, for the detection position in which the ideal slit numbers are acquired at different two or more inspection positions.

20. A non-transitory computer readable medium having recorded thereon a position detection program that is executed by a computer including a signal processing circuit and a storage device and causes the signal processing circuit to perform the following processes:
acquiring a first detection value from sensor data relating to a first slit row provided in a mobile body;

acquiring a second detection value from sensor data relating to a second slit row provided in the mobile body;

calculating a slit position signal based on the first detection value and the second detection value;

calculating a first slit number based on the slit position signal;

acquiring, from the storage device, a predetermined correction value that corrects the slit position signal, based on detection result of the first detection value and the first slit number;

applying the correction value to the slit position signal, and acquiring the first slit number after correction based on the slit position signal after correction;

deriving a position of the mobile body based on the first slit number after correction and the first detection value; wherein the correction value is determined by performing the following processes:

(1) acquiring a reference slit position signal at each of a plurality of inspection positions in a moving range of the mobile body, and deciding ideal slit numbers corresponding to each of the plurality of inspection positions based on each reference slit position signal;

(2) acquiring the slit position signals at each of the plurality of inspection positions, detecting a detection position based on the slit position signals, and acquiring an error of the slit position signal with respect to the reference slit position signal at each of the plurality of inspection positions; and (3) for each detection position acquired by step (2), generating the correction value based on any value between a maximum value and a minimum value of two or more errors associated with the detection position, for the detection position in which the ideal slit numbers are acquired at different two or more inspection positions.

* * * * *